United States Patent
Huffington et al.

(10) Patent No.: US 9,470,336 B2
(45) Date of Patent: Oct. 18, 2016

(54) MIXING VALVE ASSEMBLY INCLUDING A TEMPERATURE DISPLAY

(71) Applicant: Delta Faucet Company, Indianapolis, IN (US)

(72) Inventors: Todd A. Huffington, Avon, IN (US); Paul V. Patton, Jr., Indianapolis, IN (US); Joel D. Sawaski, Indianapolis, IN (US); Steven V. Horsman, Fishers, IN (US)

(73) Assignee: Delta Faucet Company, Indianapolis, IN (US)

( * ) Notice: Subject to any disclaimer, the term of this patent is extended or adjusted under 35 U.S.C. 154(b) by 628 days.

(21) Appl. No.: 13/894,859

(22) Filed: May 15, 2013

(65) Prior Publication Data

US 2013/0312856 A1 Nov. 28, 2013

Related U.S. Application Data

(60) Provisional application No. 61/651,352, filed on May 24, 2012.

(51) Int. Cl.
*F16K 37/00* (2006.01)
*F16K 31/60* (2006.01)
(Continued)

(52) U.S. Cl.
CPC ............ *F16K 37/005* (2013.01); *E03C 1/042* (2013.01); *E03C 1/0408* (2013.01); *F16K 11/0743* (2013.01); *F16K 31/605* (2013.01); *F16K 37/00* (2013.01); *F16K 37/0041* (2013.01); *F16K 37/0058* (2013.01); *E03C 2001/0418* (2013.01); *E03C 2201/50* (2013.01);
(Continued)

(58) Field of Classification Search
CPC ............ F16K 11/0743; F16K 31/605; F16K 37/0041; F16K 37/0033; F16K 37/0058; F16K 37/005; E03C 2001/0418; E03C 1/0408; E03C 1/042; Y10T 137/86823; Y10T 137/87692; Y10T 137/8158
See application file for complete search history.

(56) References Cited

U.S. PATENT DOCUMENTS 3,960,016 A * 6/1976 Symmons ............. F16K 11/078
  137/359
4,281,543 A 8/1981 Raz
(Continued)

FOREIGN PATENT DOCUMENTS

CN 2341717 Y 10/1999
CN 201124130 Y 10/2008
(Continued)

OTHER PUBLICATIONS

The Case for Light: Cutting-edge Light Technology Delivers Tangible Benefits in a Stylish Package; http://www.digital.bnpmedia.com/article/Decoration/483532/45749/article.html; Sep. 2010.
(Continued)

*Primary Examiner* — Atif Chaudry
(74) *Attorney, Agent, or Firm* — Faegre Baker Daniels, LLP

(57) ABSTRACT

A mixing valve assembly including a valve cartridge is supported by a valve body housing within a shower wall. The valve cartridge includes a temperature sensor in thermal communication with water provided to an outlet port of the valve body. A temperature display is configured to provide a visual indication of water temperature detected by the temperature sensor.

19 Claims, 19 Drawing Sheets

(51) Int. Cl.
  *E03C 1/04* (2006.01)
  *E03C 1/042* (2006.01)
  *F16K 11/074* (2006.01)
(52) U.S. Cl.
  CPC .... *Y10T 137/8158* (2015.04); *Y10T 137/8326* (2015.04); *Y10T 137/86823* (2015.04); *Y10T 137/87692* (2015.04)

(56) References Cited

U.S. PATENT DOCUMENTS

| | | | |
|---|---|---|---|
| 4,420,811 | A | 12/1983 | Tarnay et al. |
| 4,945,943 | A * | 8/1990 | Cogger .............. G05D 23/1393 137/360 |
| 5,172,860 | A | 12/1992 | Yuch |
| 5,535,779 | A | 7/1996 | Huang |
| 5,725,010 | A | 3/1998 | Marty et al. |
| 5,826,615 | A * | 10/1998 | Ko ..................... F16K 11/0746 137/454.6 |
| 5,963,280 | A | 10/1999 | Okuda et al. |
| 6,029,094 | A | 2/2000 | Diffut |
| 6,519,790 | B2 | 2/2003 | Ko |
| 6,892,952 | B2 | 5/2005 | Chang et al. |
| 7,124,452 | B1 | 10/2006 | Bauza |
| 7,350,973 | B2 | 4/2008 | Craig et al. |
| 7,818,830 | B2 | 10/2010 | Thorne et al. |
| 8,065,759 | B2 | 11/2011 | Smushkovich et al. |
| 8,089,473 | B2 | 1/2012 | Koottungal |
| 8,347,427 | B2 | 1/2013 | Klicpera |
| 8,469,054 | B2 | 6/2013 | Lang et al. |
| 2003/0033868 | A1 * | 2/2003 | Posey et al. .......... F16K 5/0647 73/168 |
| 2003/0156620 | A1 | 8/2003 | Wang |
| 2003/0202558 | A1 | 10/2003 | Chung et al. |
| 2006/0045167 | A1 | 3/2006 | Pawlenko |
| 2006/0203880 | A1 | 9/2006 | Batcho |
| 2006/0231140 | A1 | 10/2006 | McNerney |
| 2009/0106891 | A1 | 4/2009 | Klicpera |
| 2009/0108223 | A1 | 4/2009 | Deutsch et al. |
| 2011/0005619 | A1 | 1/2011 | Kanemaru et al. |
| 2011/0068192 | A1 | 3/2011 | Klicpera |
| 2011/0209782 | A1 | 9/2011 | Yao |
| 2013/0299016 | A1 | 11/2013 | Lee |
| 2013/0312856 | A1 | 11/2013 | Huffington et al. |

FOREIGN PATENT DOCUMENTS

| | | |
|---|---|---|
| CN | 201683802 U | 12/2010 |
| CN | 201760356 U | 3/2011 |
| GB | 2453871 A | 4/2009 |
| KR | 452641 Y1 | 3/2011 |
| WO | WO 2011/091595 | 8/2011 |

OTHER PUBLICATIONS

LCD Shower Digital Shower Screen Color Changed by Water Temperature Bathing Faucet Temperature Display Showerhead 20 pcs/lot; http:www.aliexpress.com/item/LCD-shower-digital-shower-screen-color-changed-by-water-temperature-bathing-faucet-temperature-display-showerhead-20/587678191.html; 2014.

* cited by examiner

MIXING VALVE ASSEMBLY INCLUDING A TEMPERATURE DISPLAY

CROSS-REFERENCE TO RELATED APPLICATION

This application claims priority to U.S. provisional patent application Ser. No. 61/651,352, filed May 24, 2012, the disclosure of which is expressly incorporated by reference herein.

BACKGROUND AND SUMMARY OF THE INVENTION

The present invention relates generally to valves for use with fluid delivery devices and, more particularly, to a mixing valve assembly for use with a tub/shower installation and including a temperature display.

Single handle mixing valves are often used in connection with fluid delivery devices, such as tub spouts and shower heads. Rotation of the handle typically controls the relative proportion of water supplied from hot and cold water supply ports to an outlet port. Conventional mixing valves often include a built-in pressure balance mechanism to prevent rapid changes of water temperature in response to either a hot water supply pressure drop or a cold water supply pressure drop.

The present disclosure relates to a mixing valve assembly or system that is configured to be retrofit within a standard behind-the-wall valve body. Illustratively, the system includes a valve cartridge including a self-contained temperature sensor which is in communication with a temperature display supported by a mounting assembly supported exterior to the shower wall. The valve cartridge may also include a position sensor for activating and deactivating the temperature display, thereby conserving power based upon a detected rotational position of a valve handle.

According to an illustrative embodiment of the present disclosure, a mixing valve assembly includes a valve body housing configured to be supported within a shower wall, the valve body housing including an outlet port, a hot water supply port, and a cold water supply port. A valve cartridge is supported by the valve body housing and includes a cap, a valve plate including a first control opening in selective fluid communication with the hot water supply port and a second control opening in selective fluid communication with the cold water supply port, the valve plate being supported for rotation relative to the cap. A stem is operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to the outlet port. A temperature sensor is supported by the cap and includes a sensing end in thermal communication with water provided to the outlet port. A mounting assembly is configured to be supported outside of the shower wall, the mounting assembly including a temperature display in electrical communication with the temperature sensor to provide a visual indication of water temperature detected by the temperature sensor. A handle is operably coupled to the stem and is accessible exterior of the mounting assembly.

According to a further illustrative embodiment of the present disclosure, a mixing valve cartridge is configured to be removably received within a valve body housing, the mixing valve cartridge including a cap, a valve plate having a first control opening in selective fluid communication with a hot water supply port of the valve body housing and a second control opening in selective fluid communication with a cold water supply port of the valve body housing, the valve plate being supported for rotation relative to the cap. A stem is operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to an outlet port of the valve body housing. A temperature sensor is supported by the cap, the temperature sensor extending axially between a connection end and a sensing end, the connection end being configured to be in electrical communication with a temperature display and the sensing end configured to be in thermal communication with water provided to the outlet port of the valve body housing.

According to another illustrative embodiment of the present disclosure, a mixing valve assembly includes a valve body configured to be supported within a shower wall, the valve body having an outlet port, a hot water supply port, and a cold water supply port. A valve cartridge is supported by the housing and includes a cap, a valve plate including a first control opening in selective fluid communication with the hot water supply port and a second control opening in selective fluid communication with the cold water supply port, the valve plate being supported for rotation relative to the cap. A stem is operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to the outlet port. A position sensor is operably coupled to the stem. A display is configured to provide a visual indication to a user when in an active state, wherein the temperature display is in an active state when the position sensor indicates that the stem is in a first rotational position, and the temperature display is in an inactive state when the position sensor indicates that the stem is in a second rotational position.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
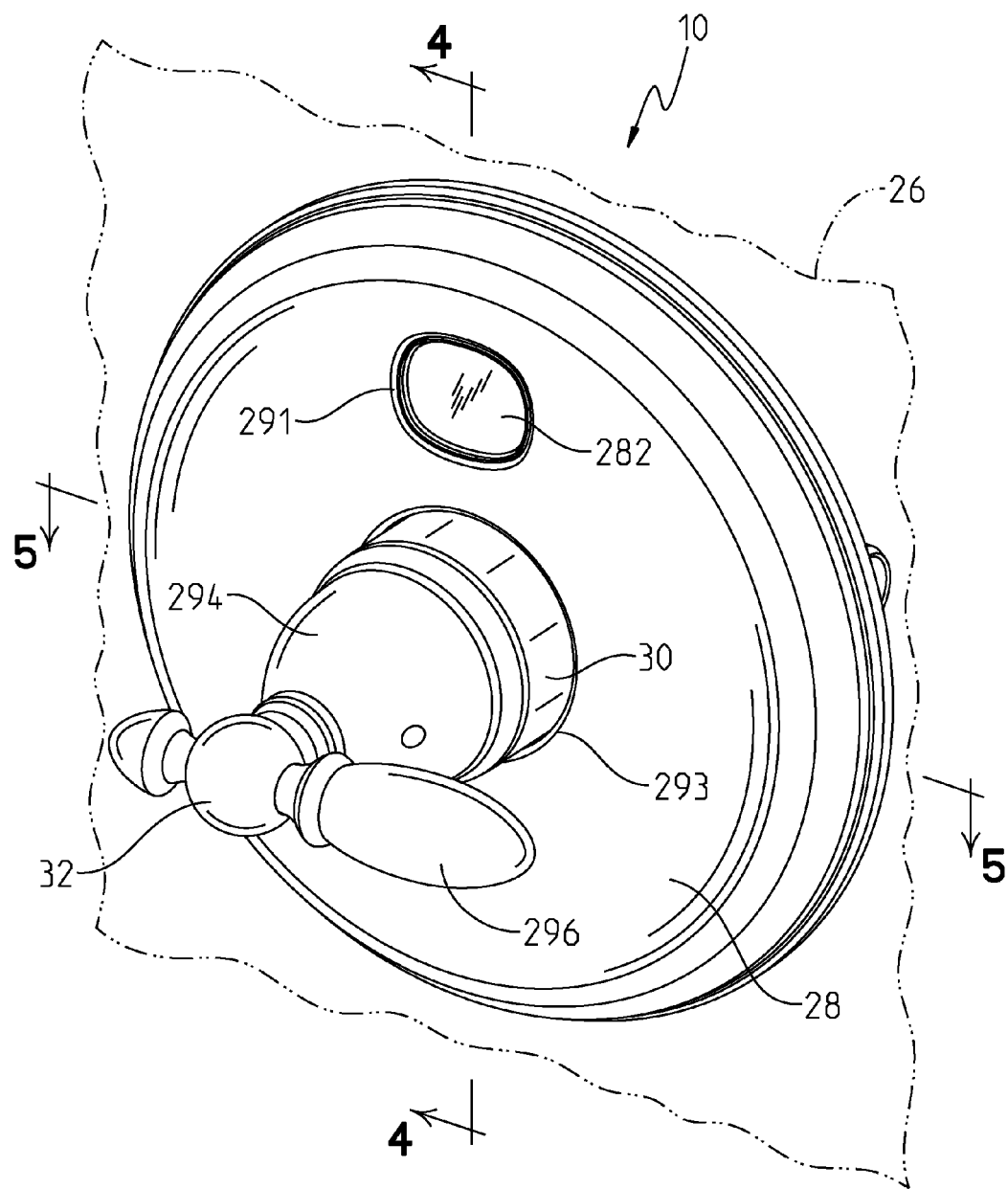
FIG. 1 is a front perspective view of an illustrative embodiment mixing valve assembly of the present disclosure.

The embodiments of the invention described herein are not intended to be exhaustive or to limit the invention to precise forms disclosed. Rather, the embodiments selected for description have been chosen to enable one skilled in the art to practice the invention.

With reference to FIGS. 1-7, an illustrative mixing valve assembly 10 includes a valve cartridge 12 that is received within a standard behind-the-wall rough or valve body 14. As further detailed herein, the valve cartridge 12 illustratively includes a water parameter sensor, illustratively a temperature sensor 16, and a position sensor 18. A mounting assembly 20 illustratively houses electronics 22 and a power supply 24, and mates to a finished outer shower wall 26. The valve assembly 10 further includes a decorative escutcheon 28, a trim sleeve 30, and a handle 32 operably coupled to the valve cartridge 12 exterior of the shower wall 26.

Referring further to FIGS. 3-7, illustrative embodiment mixing valve assembly 10 includes valve fitting or body 14 which may be mounted behind shower wall 26 by way of a mounting bracket 34. A plaster guard 35 may be supported by the mounting bracket 34, and is illustratively of the type disclosed in U.S. Patent Application Publication No. US 2006/0231140 to McNerney, the disclosure of which is expressly incorporated by reference herein. The illustrative valve body 14 includes a cylindrical sidewall 36 defining a central housing 38 and extending axially along a longitudinal axis 40 from a bottom wall 42 and defining a chamber or cavity 44. The valve cartridge 12 may be secured within the valve body 14 by a bonnet nut 46. A spacer 47 may be positioned between the bonnet nut 46 and the trim sleeve 30.

Figure 2:
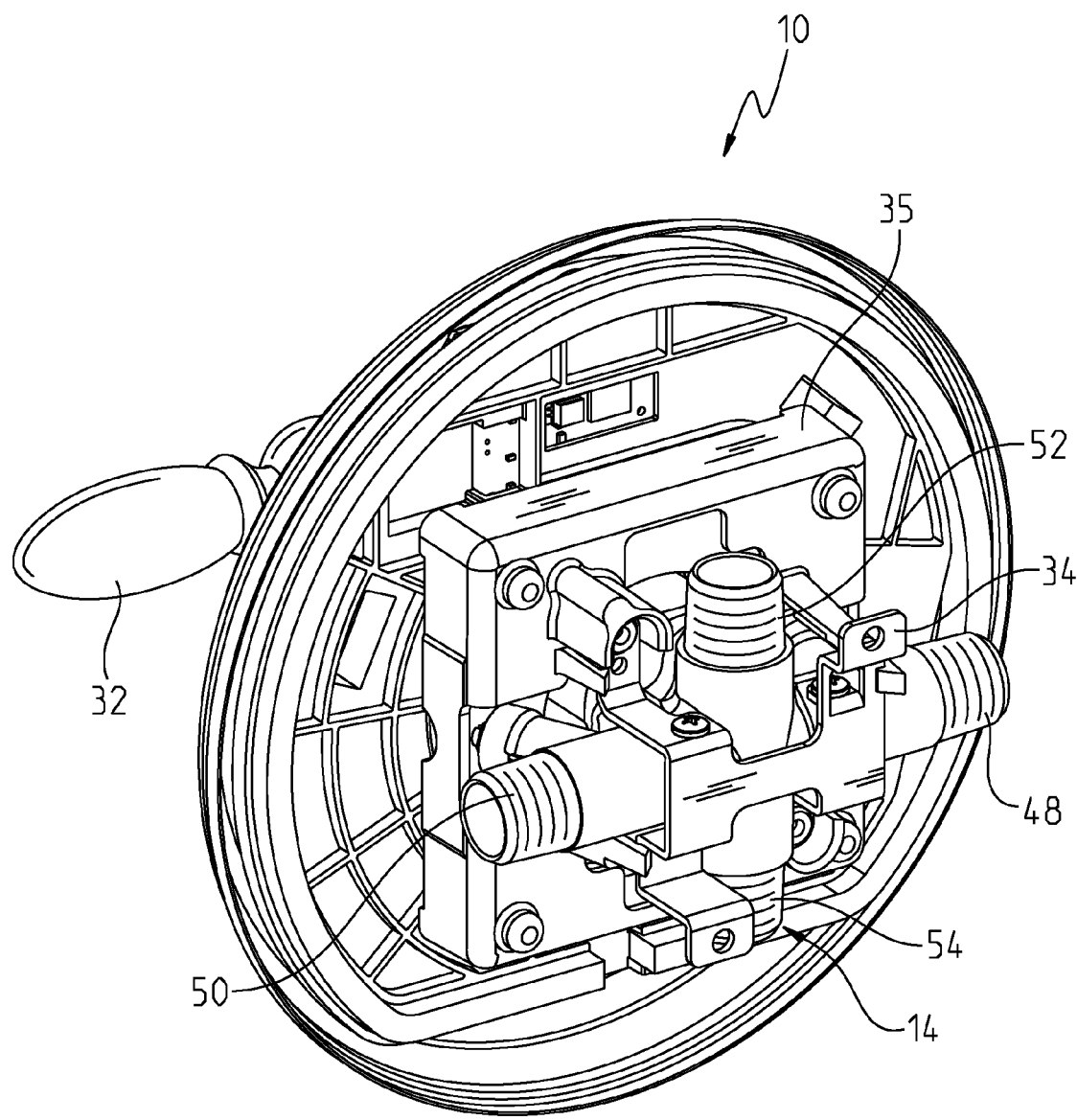
FIG. 2 is a rear perspective view of the illustrative embodiment mixing valve assembly of FIG. 1.
Figure 3:
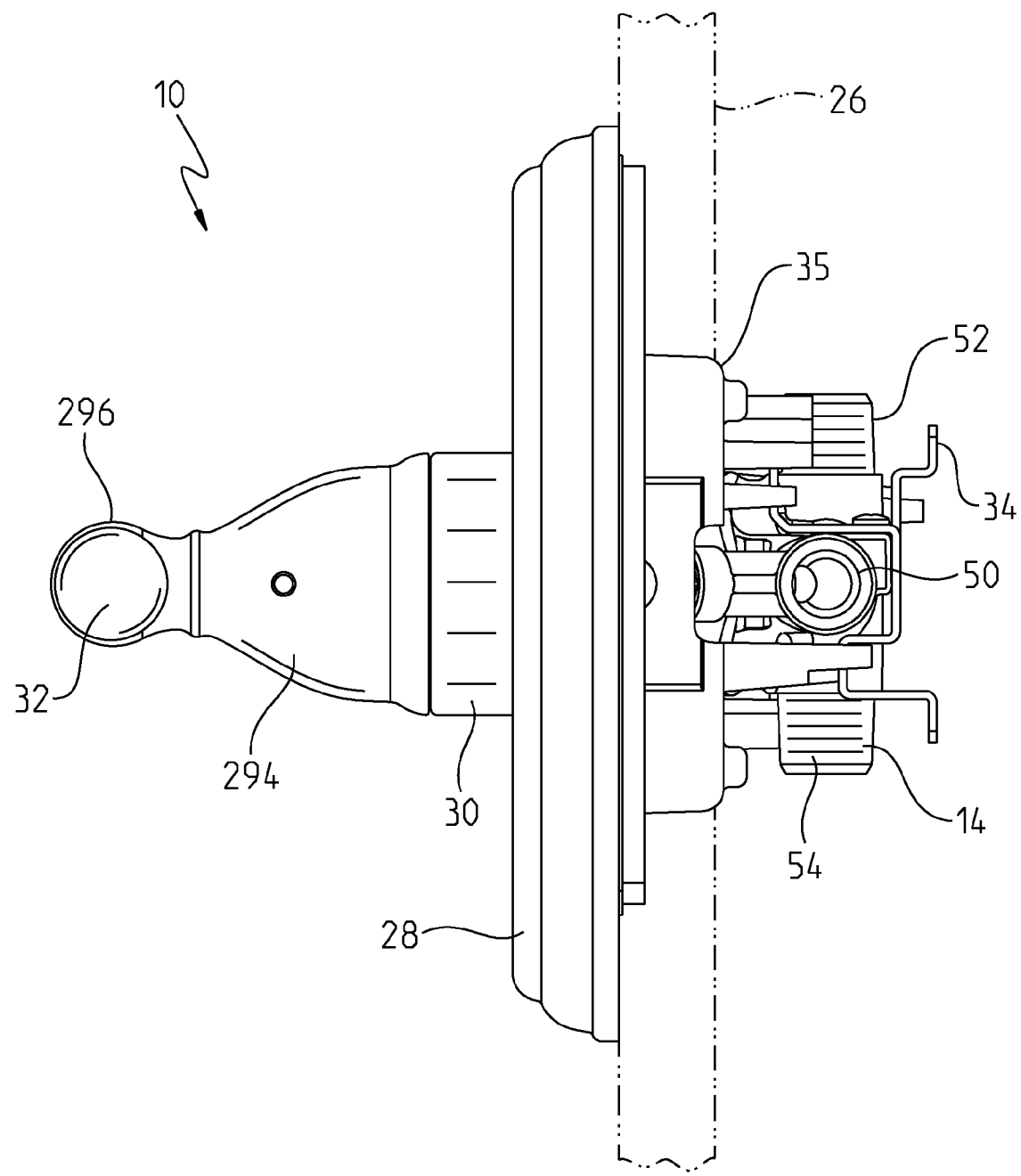
FIG. 3 is a side elevational view of the mixing valve assembly of FIG. 1.
Figure 7:
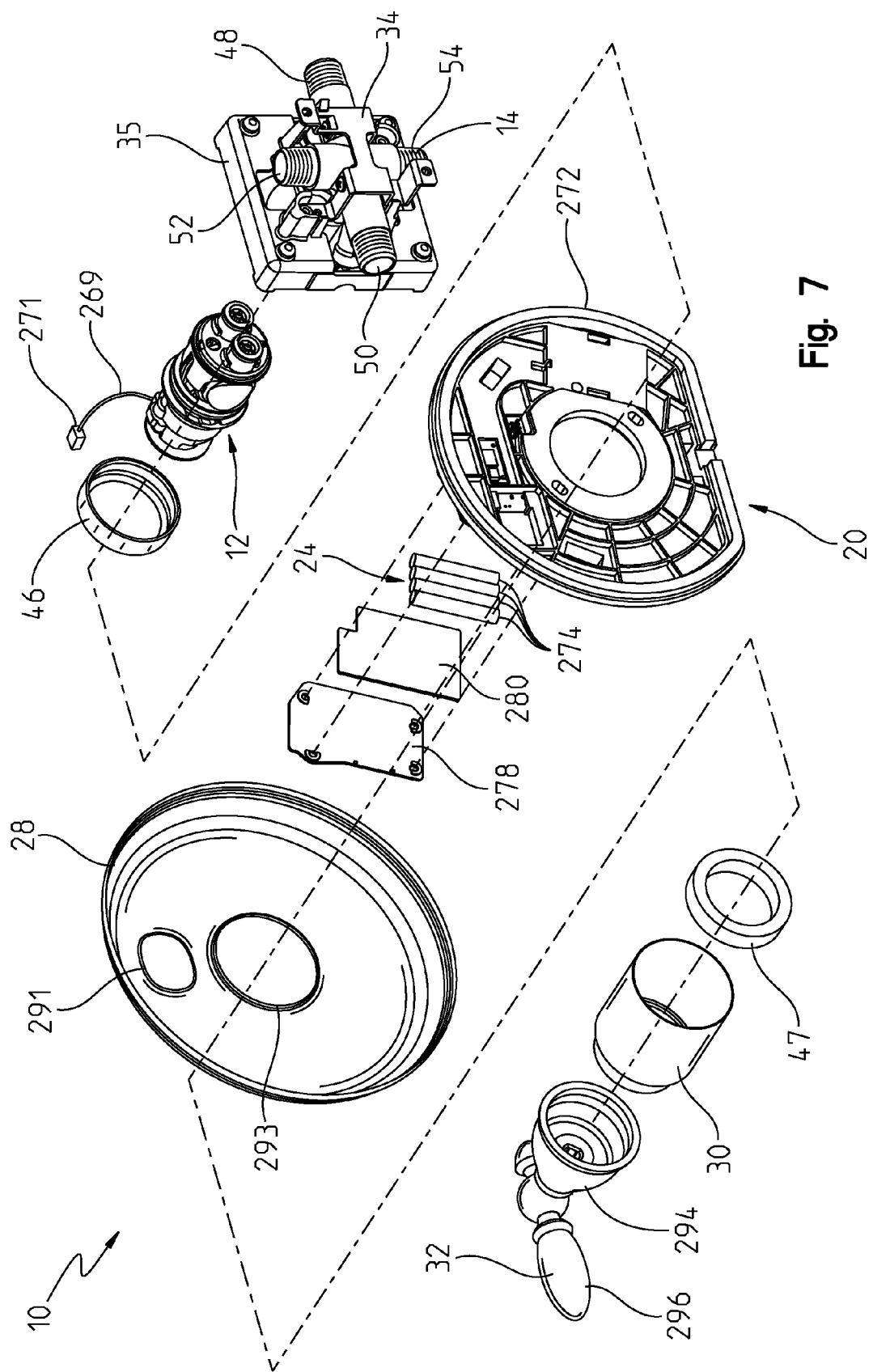
FIG. 7 is a rear exploded perspective view of the mixing valve assembly of FIG. 1.

With reference to FIGS. 2 and 7, the valve body 14 further includes a tubular hot water inlet 48 which is configured to be fluidly coupled to a conventional hot water supply (not shown), and a tubular cold water inlet 50 which is configured to be fluidly coupled to a conventional cold water supply (not shown). First and second tubular outlets 52 and 54 are illustratively fluidly coupled to first and second fluid delivery devices, such as a shower head and a tub spout (not shown).

Figure 4:
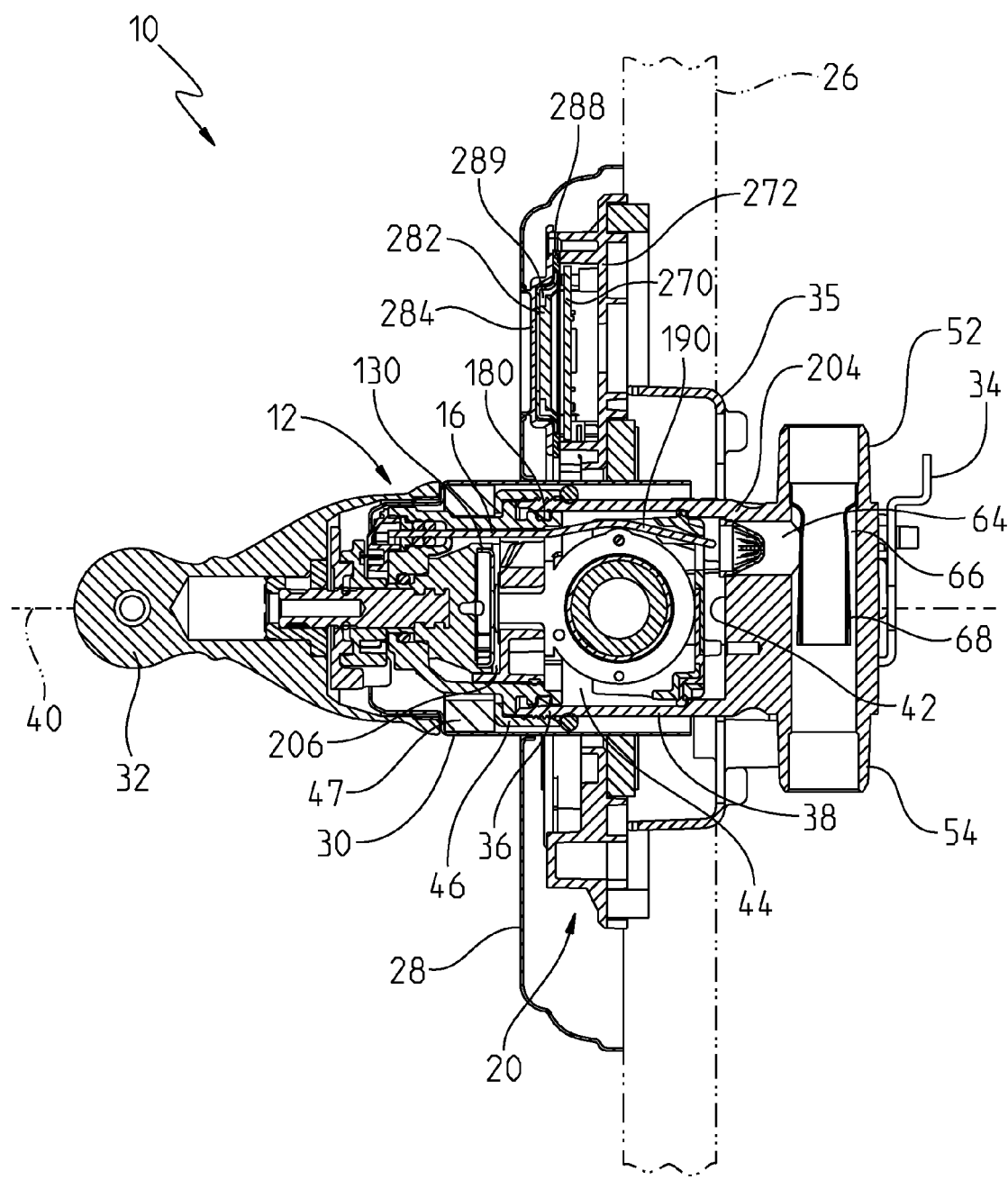
FIG. 4 is a cross-sectional view taken along line 4-4 of FIG. 1.
Figure 5:
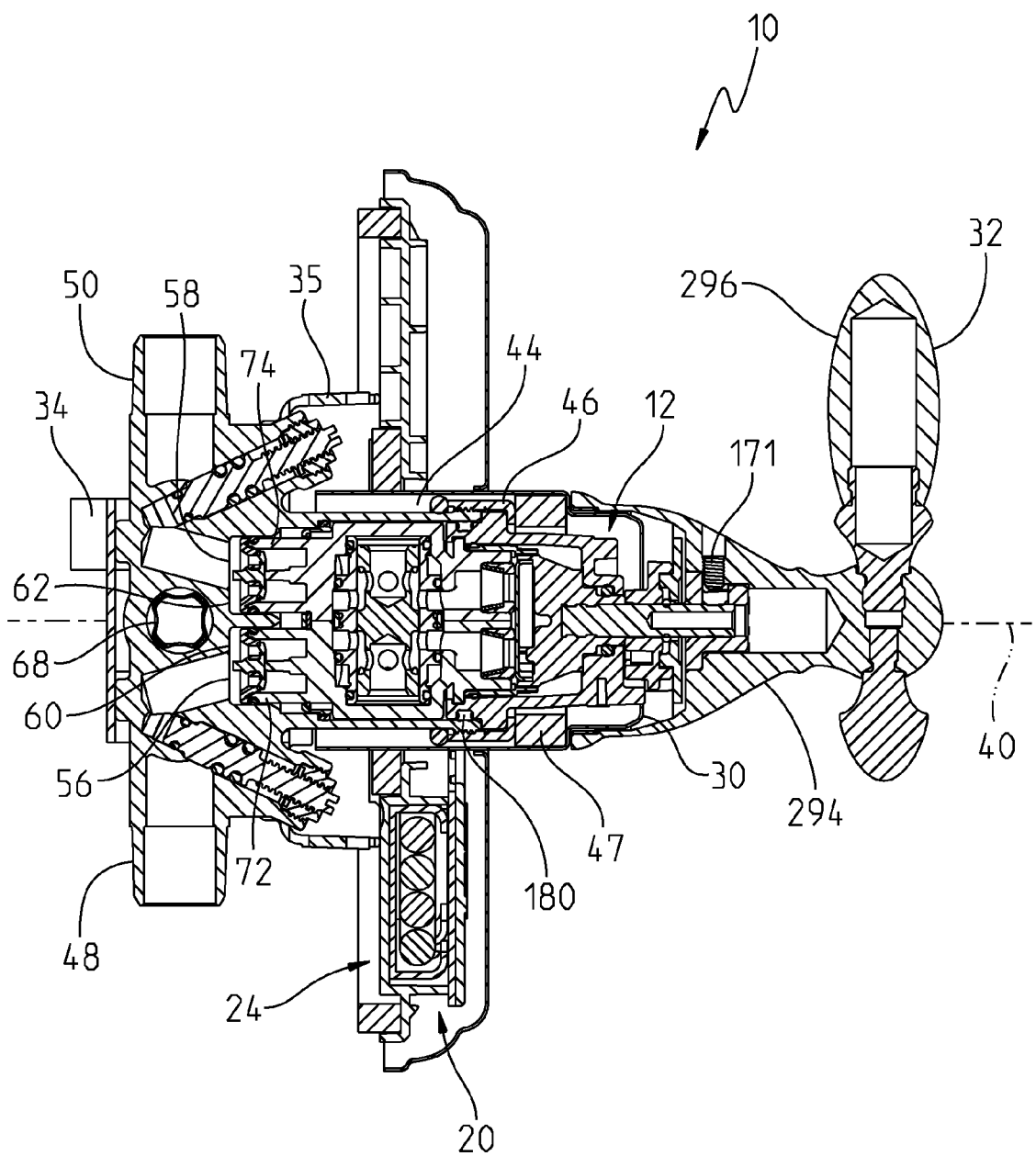
FIG. 5 is a cross-sectional view taken along line 5-5 of FIG. 1.

With further reference to FIGS. 4 and 5, the bottom wall 42 illustratively includes a hot water supply port 56 in fluid communication with the hot water inlet 48, and a cold water supply port 58 in fluid communication with the cold water inlet 50. The supply ports 56 and 58 may include counterbores 60 and 62, respectively. At least one discharge or outlet port 64 also extends through the bottom wall 42 and is in fluid communication with outlets 52 and 54 through a connecting bore 66. A diverter valve (not shown) may be fluidly coupled to the valve fitting 14 to selectively divert water from the outlet port 64 to one of the outlets 52 and 54. Further, an aspirator or ejector 68 may be received within the connecting bore 66 to generate a vacuum to prevent water leakage through a shower head connected to the first outlet 52. The sidewall 36 illustratively contains external threads adjacent its upper end which are adapted to threadably couple with internal threads of the bonnet nut 46 having internal threads.

With respect to FIGS. 9-13, the mixing valve cartridge 12 is illustratively non-rotatably disposed in the cavity 44 of the valve body 14. The mixing valve cartridge 12 includes an inner valve assembly 70 fluidly coupled to an outer valve assembly 71. The inner valve assembly 70 illustratively includes laterally spaced apart, axially inwardly projecting first and second tubes 72 and 74. The first tube 72 is illustratively fitted into counterbore 60 of body 14, while the second tube 74 is fitted into the counterbore 62 of the valve body 14. Seals, illustratively o-rings 76 and 78, are provided to sealingly engage the sidewalls of counterbores 60 and 62 to prevent water from supply ports 56 and 58 from entering the cavity 44 and reaching the outlet port 64.

Check valves 80 and 82 are illustratively coupled to the tubes 72 and 74 and are configured to prevent cross-flow of hot water from the hot water inlet 48 into the cold water inlet 50 and vice versa. Such a cross-flow could occur if there is a pressure differential between the hot and cold water inlets 48 and 50.

Figure 11:
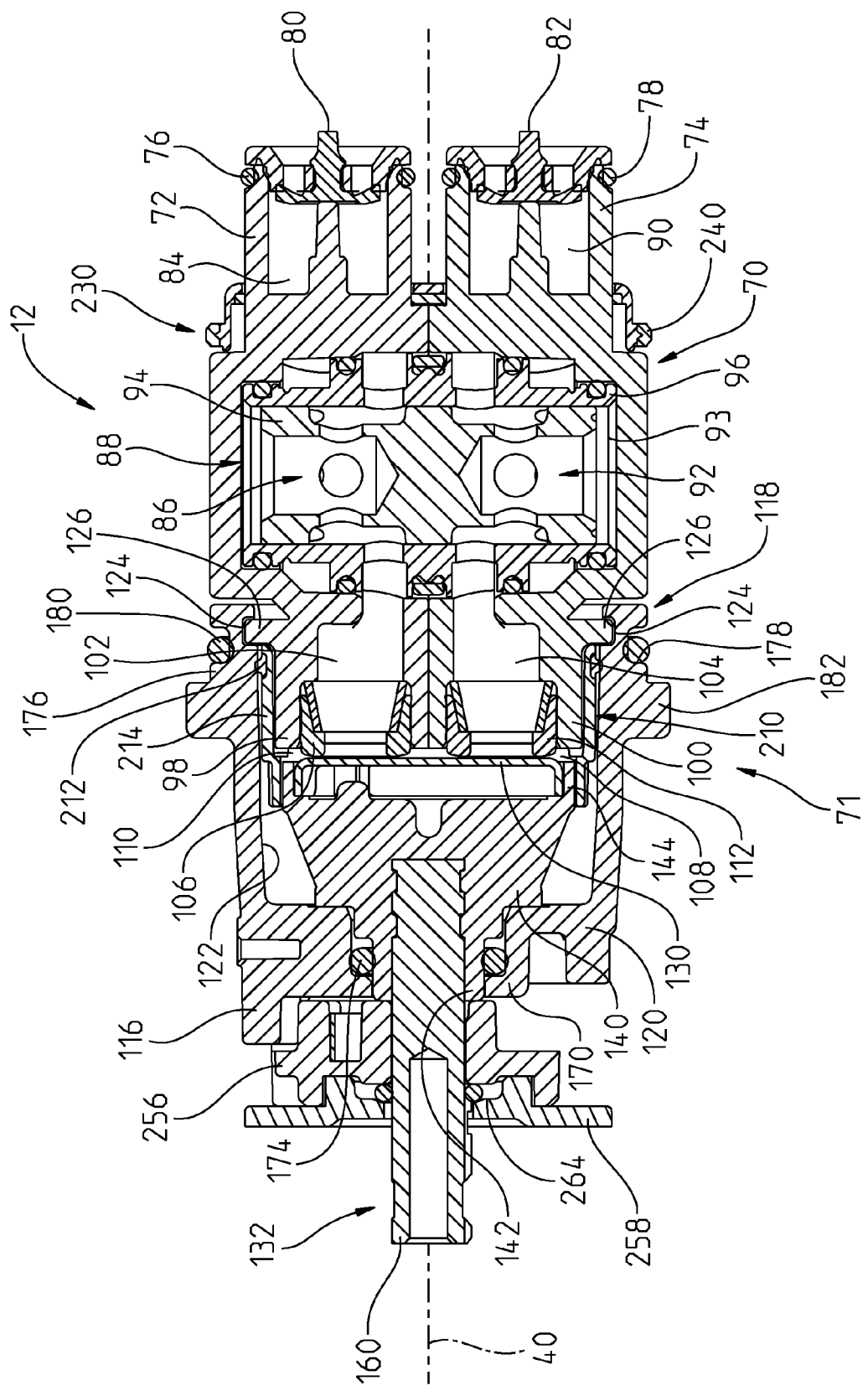
FIG. 11 is a cross-sectional view taken along line 11-11 of FIG. 9.

With reference to FIG. 11, the first tube 72 includes a passageway 84 leading to a first section 86 of a spool-type pressure balancing valve 88. Similarly, the second tube 74 has a passageway 90 leading to a second section 92 of the pressure balancing valve 88. The pressure balancing valve 88 is illustratively disposed in a chamber 93 of the inner valve assembly 70. The pressure balancing valve 88 may be of a conventional design and illustratively includes a piston 94 which is slidably mounted within an outer spool 96. Such illustrative spool-type pressure balancing valves are known in the art and may be of the type shown in U.S. Pat. No. 5,725,010 to Marty et al.

Figure 12:
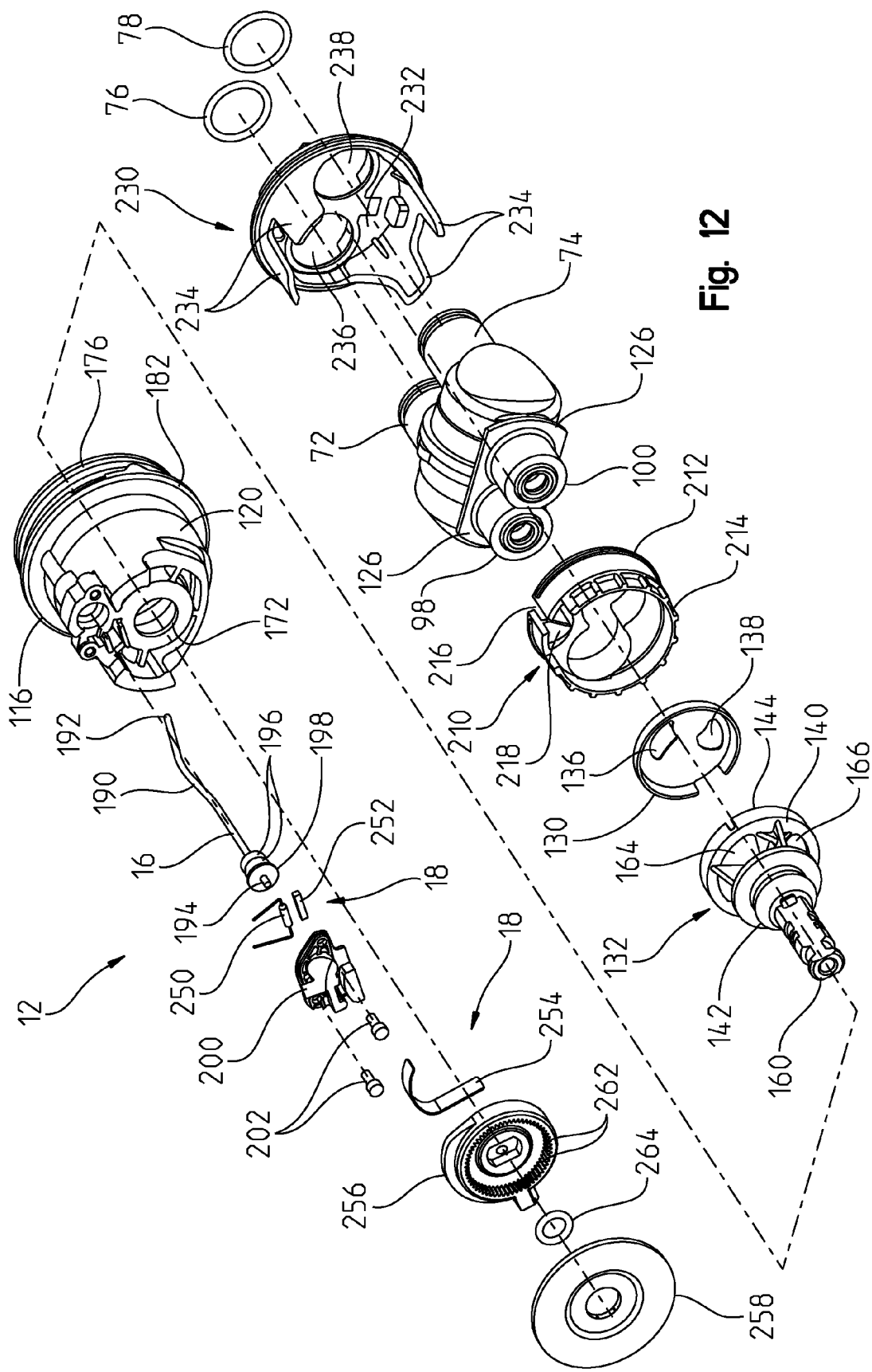
FIG. 12 is a front exploded perspective view of the mixing valve cartridge of FIG. 9.
Figure 13:
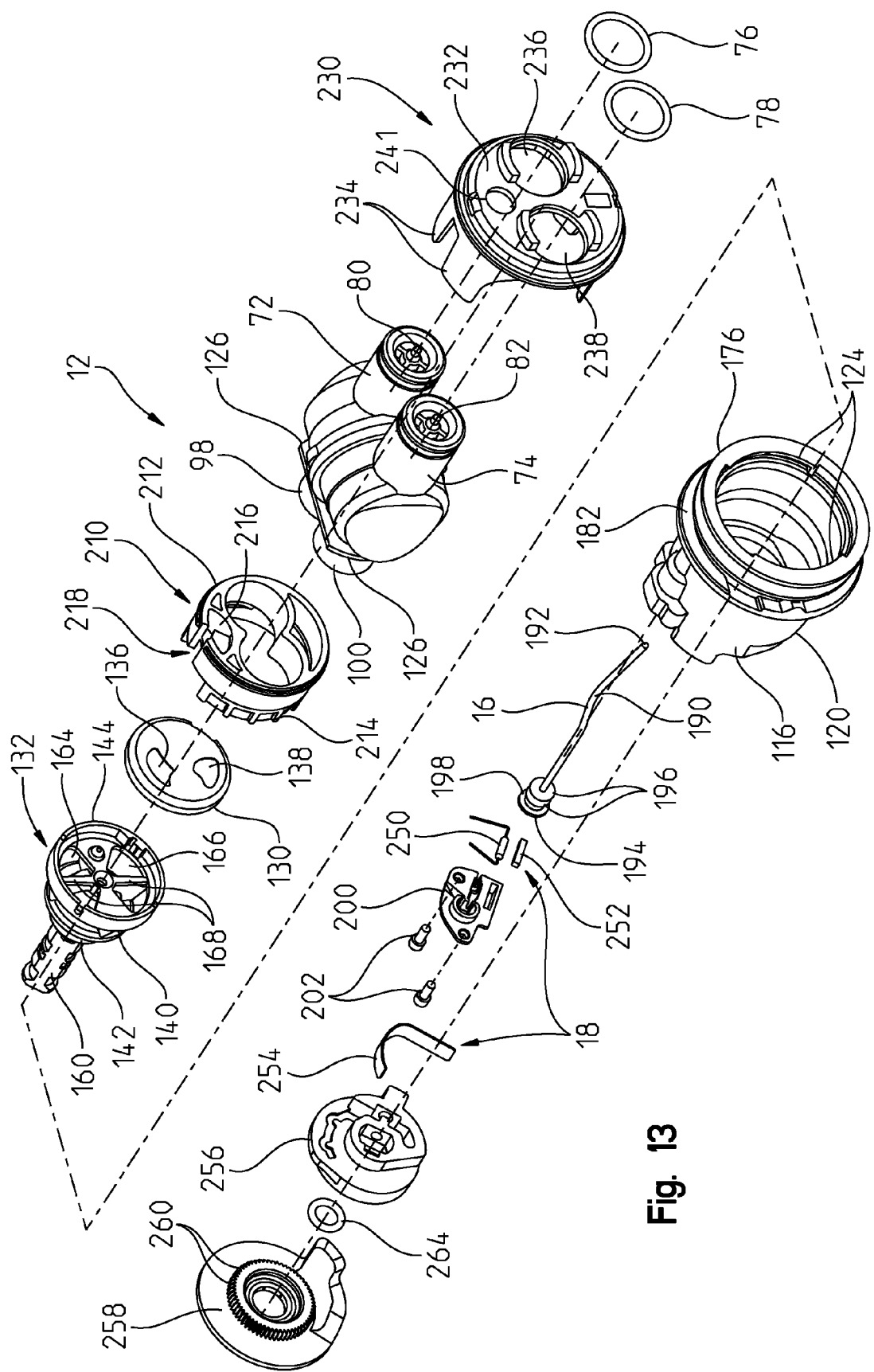
FIG. 13 is a rear exploded perspective view of the mixing valve cartridge of FIG. 9.

With reference to FIGS. 11-13, the valve cartridge 12 further includes laterally spaced apart axially outwardly extending first and second tubes 98 and 100. The first tube 98 defines a first outlet passageway 102, and the second tube 100 defines a second outlet passageway 104. Outlet passageway 102 is in fluid communication with the first section 86 of the pressure balancing valve 88, while outlet passageway 104 is in fluid communication with the second section 92 of the pressure balancing valve 88. Tubes 98 and 100 include bores 106 and 108 which receive seals, illustratively spring and seal assemblies 110 and 112, respectively.

Referring further to FIGS. 9-13, the inner valve assembly 70 of valve cartridge 12 is operably coupled to the outer valve assembly 71. More particularly, the outer valve assembly 71 includes a housing cap 116 secured to the inner valve assembly 70 through a bayonet lock 118. As shown in FIG. 11, the housing cap 116 includes substantially cylindrical sidewall 120 having an inner surface 122 formed with a pair of diametrically opposed arcuate grooves 124. The inner valve assembly 70 includes bayonet projections 126 configured to be received within the grooves 124 of the cap 116 when rotated to an interlocked position.

The outer valve assembly 71 further includes a flow control valve plate 130, illustratively formed of stainless steel, operably coupled to a stem assembly 132. The stem assembly 132 is operably coupled to handle 32 for rotation therewith as detailed herein. The valve plate 130 includes a hot water control aperture 136 and a cold water control aperture 138. As the handle 32 rotates, it also rotates the stem assembly 132 about longitudinal axis 40 such that the flow control valve plate 130 rotates the control apertures 136 and 138 for selective fluid communication with the hot and cold water outlet passageways 102 and 104, respectively, of the inner valve assembly 70.

As is known, when the stem assembly 132 is in an inactive or off position, neither control aperture 136, 138 is in fluid communication with fluid passageways 102, 104, such that no water flows therethrough. Rotation of the stem assembly 132 in a counterclockwise direction from the off position moves the valve plate 130 to an active or on position, such that the cold water passageway 104 is in fluid communication with the cold water control aperture 138 to initiate a cold water flow. As rotation continues, the hot water control aperture 136 begins to align with hot water passageway 102 to start hot water flow. As such, hot and cold water begins to mix. At a full counterclockwise orientation, maximum hot water flow is provided through hot water control aperture 136, while no cold water flow is provided through the cold water control aperture 138. The control apertures 136 and 138 in the valve plate 130 are in communication with the outlet port 64. As further detailed herein, water flowing through control apertures 136 and 138 mix within the cap 116 and flow around inner valve assembly 70 to the outlet port 64.

The stem assembly 132 includes a stem receiver 140, illustratively made of a thermoplastic, having a support member 142 and a downwardly extending cylindrical skirt 144. The skirt 144 couples to the stem assembly 132 of the control valve plate 130. The stem receiver 140 may include a stop surface configured to engage a radially inwardly extending stop shoulder or projection formed within the cap 116 to limit clockwise rotation of the stem assembly 132. The stem receiver 140 receives a stem 160 which is affixed against rotation relative to the stem receiver 140. In one illustrative embodiment, the stem receiver 140 may be overmolded around a portion of the stem 160.

With reference with FIGS. 12 and 13, water openings 164 and 166 are formed within the stem receiver 140 and are in fluid communication with the hot and cold water control apertures 136 and 138, respectively, of the valve plate 130. Ribs 168 may extend within the openings 164 and 166 in order to provide additional support to the support member 142.

Figure 10:
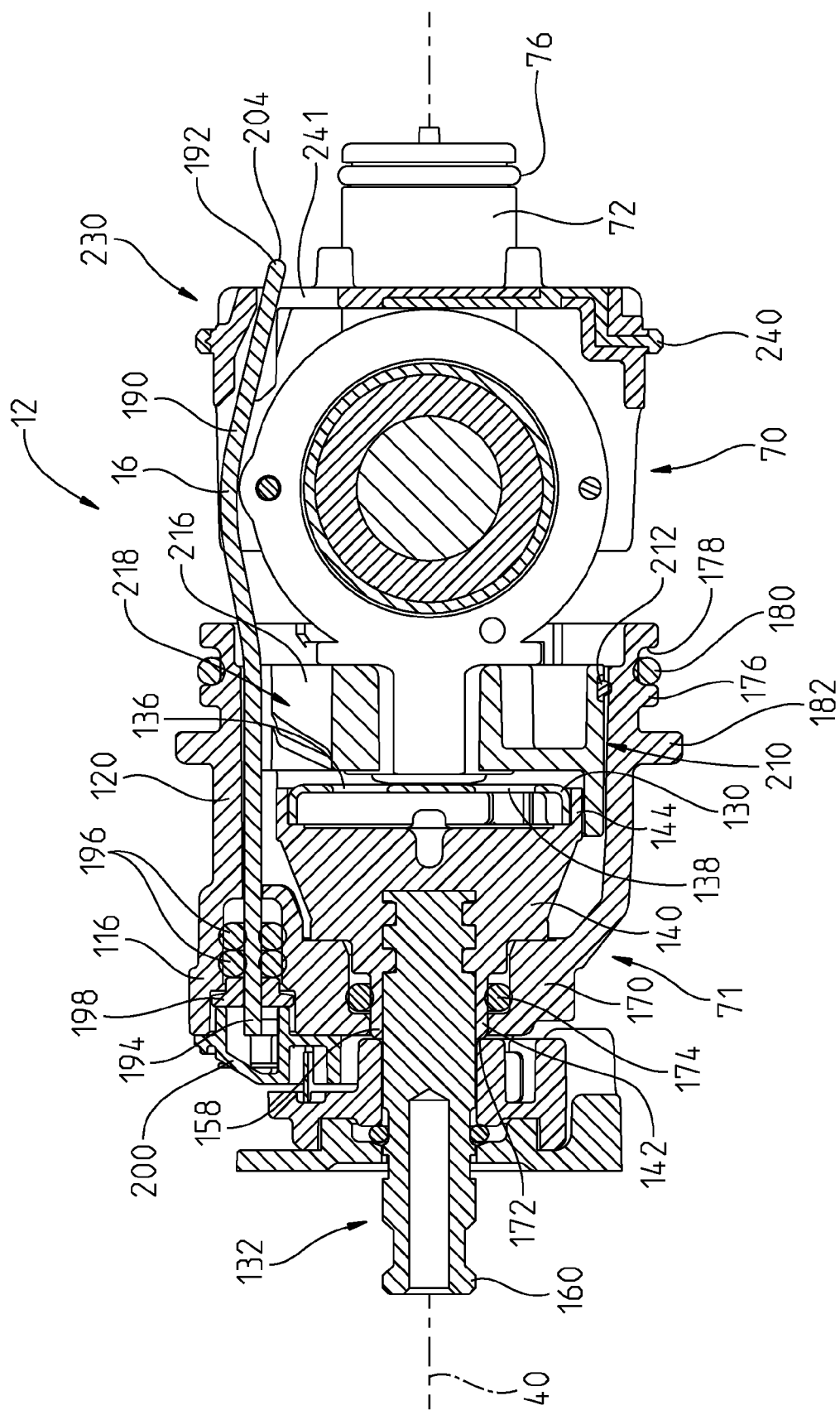
FIG. 10 is a cross-sectional view taken along line 10-10 of FIG. 9.

The stem assembly 132 is rotatably received within the cap 116, with an outer portion 158 of the support member 142 fitting within a reduced diameter portion 170 of the housing cap 116 (FIG. 10). The stem 160 extends axially outwardly through the housing cap 116 through a center aperture 172. The handle 32 is coupled to the stem 160, illustratively through a set screw 171 (FIG. 5), to rotate therewith. A sealing o-ring 174 is illustratively disposed between the inner surface of the reduced diameter portion 170 of the housing cap 116 and the outer portion 158 of the stem assembly 132.

Figure 6:
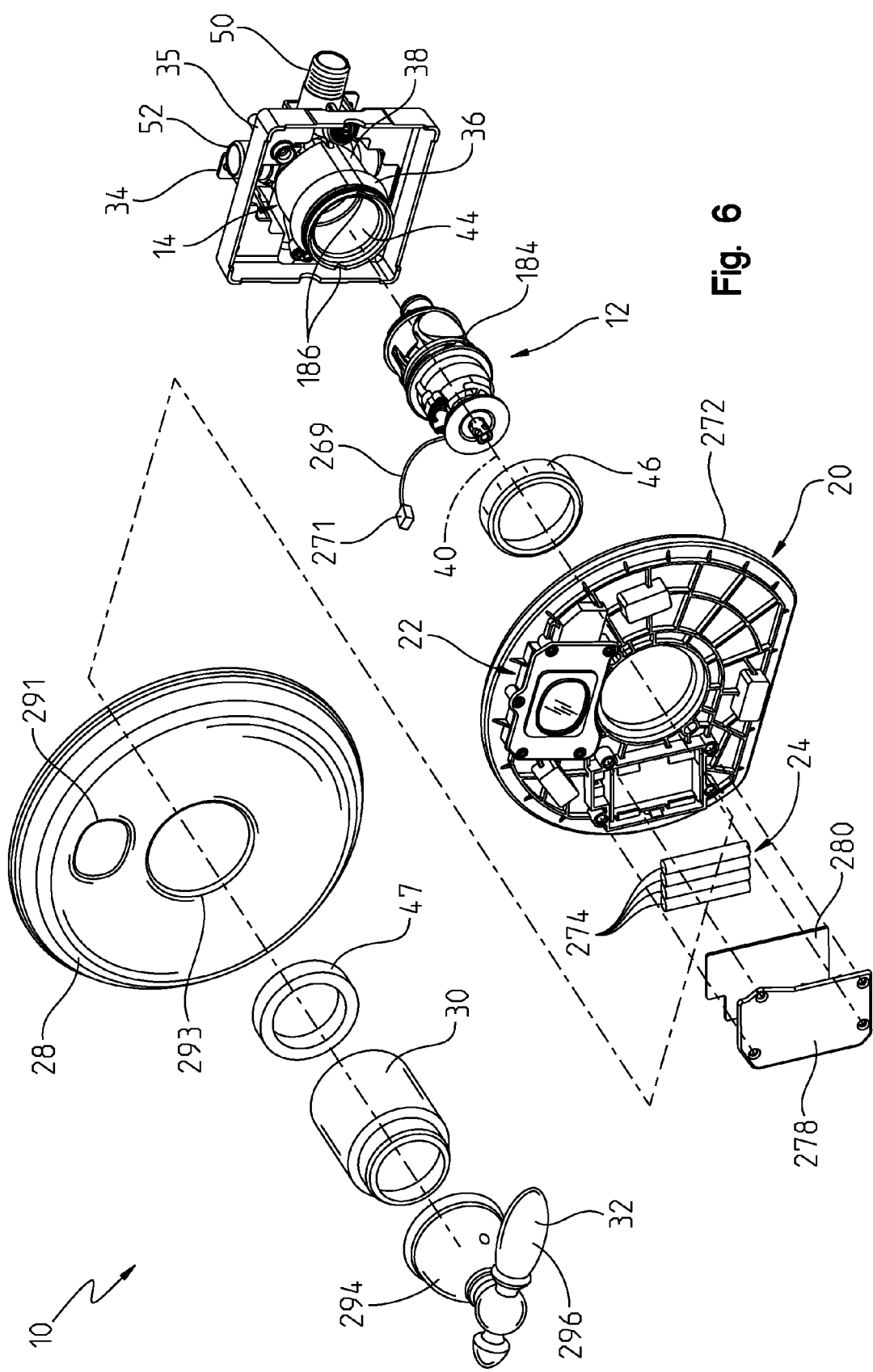
FIG. 6 is a front exploded perspective view of the mixing valve assembly of FIG. 1.
Figure 9:
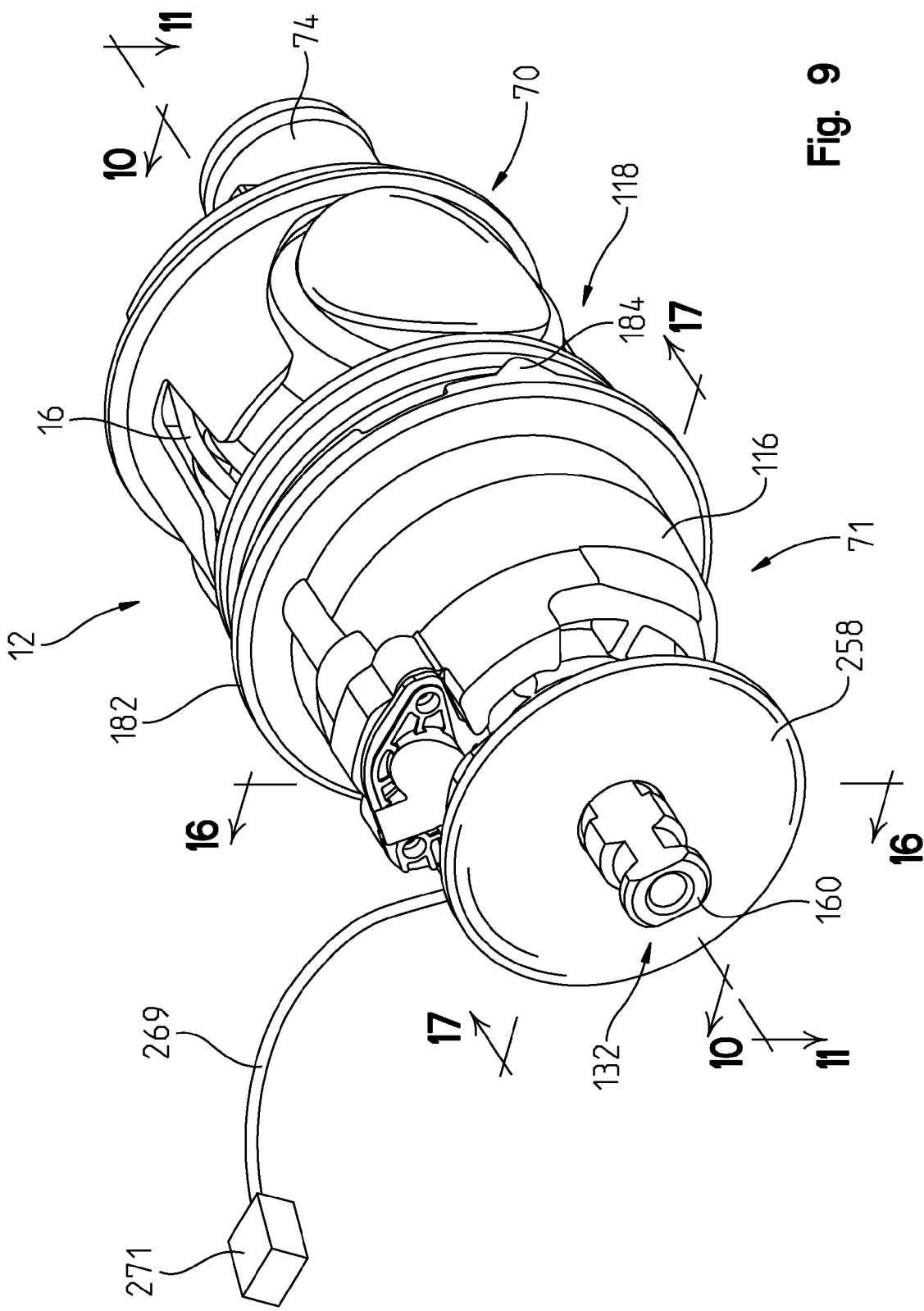
FIG. 9 is a perspective view of the mixing valve cartridge of FIG. 1.

The housing cap 116 includes a base portion 176 having an outer annular groove 178 for receiving an o-ring 180. The cap 116 further includes an annular flange 182 positioned above the base portion 176. The flange 182 has a pair of diametrically opposed, axially extending keys 184 that fit within slots 186 at the open upper end of the sidewall 36 of valve body 14. Each key 184 illustratively has a convex, rounded shape, while each slot 186 is of a complementary concave shape (FIGS. 6 and 9). This arrangement allows for ease of assembly and disassembly of the cartridge 12 by allowing the housing cap 116 to cam in or out of the housing 38 of valve body 14.

As illustrated in FIGS. 4 and 5, the base portion 176 of the housing cap 116 fits within the housing 38 of valve body 14. The o-ring 180 is disposed between the outer surface of the base portion 176 and the inner surface of the sidewall 36 of the housing 38 to prevent leakage between the housing cap 116 and the valve body 14. The bottom of the annular flange 182 abuts against the top of the sidewall 36 of the housing 38.

With reference to FIGS. 10, 12, and 13, temperature sensor 16 extends axially along the length of the valve cartridge 12 and is coupled to the housing cap 116. The temperature sensor 16 illustratively comprises a thermistor 190 including a sensing end 192 and an opposing connecting end 194. The connecting end 194 of the thermistor 190 is sealed with o-rings 196. A cap or flange 198 is welded at the connecting end 194 of thermistor 190, and is secured in place with a housing or retainer 200 utilizing screws 202 that secure it to the housing cap 116. A temperature sensing element 204 is located at the sensing end 192 and is positioned distally from the connecting end 194 and remote from an initial mixing point 206 of the valve cartridge 12 (FIG. 4). Illustratively, the initial mixing point 206 is defined immediately downstream from the valve plate 130. Instead, the sensing end 192 of the thermistor 190 is positioned proximate the outlet port 64 of the valve cartridge 12. Such relative positioning provides increased distance for the hot and cold water to mix downstream from the valve plate 130 and thereby provide the thermistor 190 with greater sensing accuracy.

The valve cartridge 12 may include a flow director 210 received within the housing cap 116 and positioned downstream from the valve plate 130. The flow director 210 is configured to assist in mixing hot and cold water passing through the valve plate 130 upstream from the sensing end 192 of the thermistor 190, and thereby facilitate a more uniform temperature distribution within the mixed water measured by the thermistor 190. Illustratively, the flow director 210 is captured between the inner valve assembly 70 and the outer valve assembly 71. The flow director 210 may be molded from a polymer. An elastomeric seal 212 is illustratively overmolded with the flow director 210 and provides a fluid seal with the housing cap 116.

Figure 14:
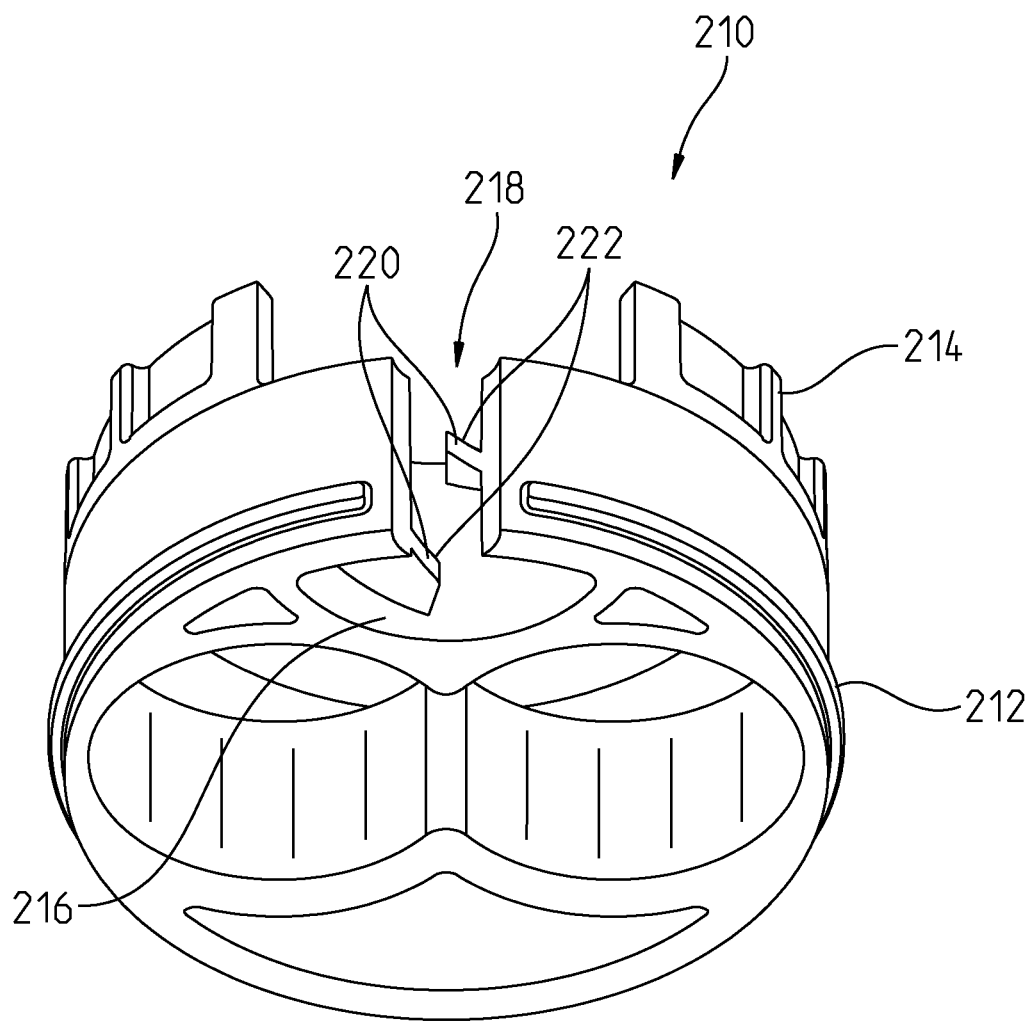
FIG. 14 is a perspective view of the flow director of the mixing valve cartridge of FIG. 9.
Figure 15:
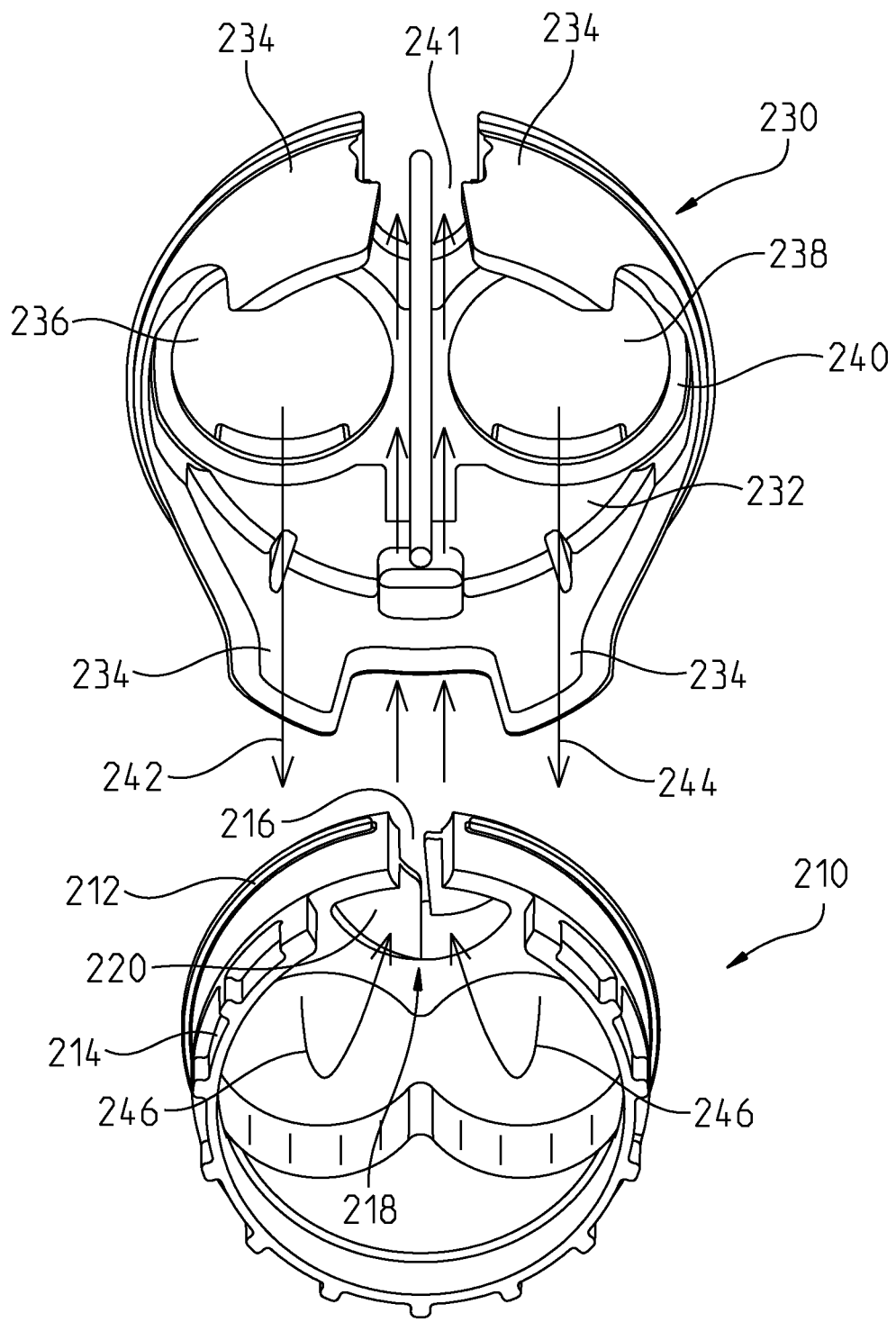
FIG. 15 is an exploded perspective view illustrating water flow directed to the sensing end of the temperature sensor by the flow director and the baffle.
Figure 16:
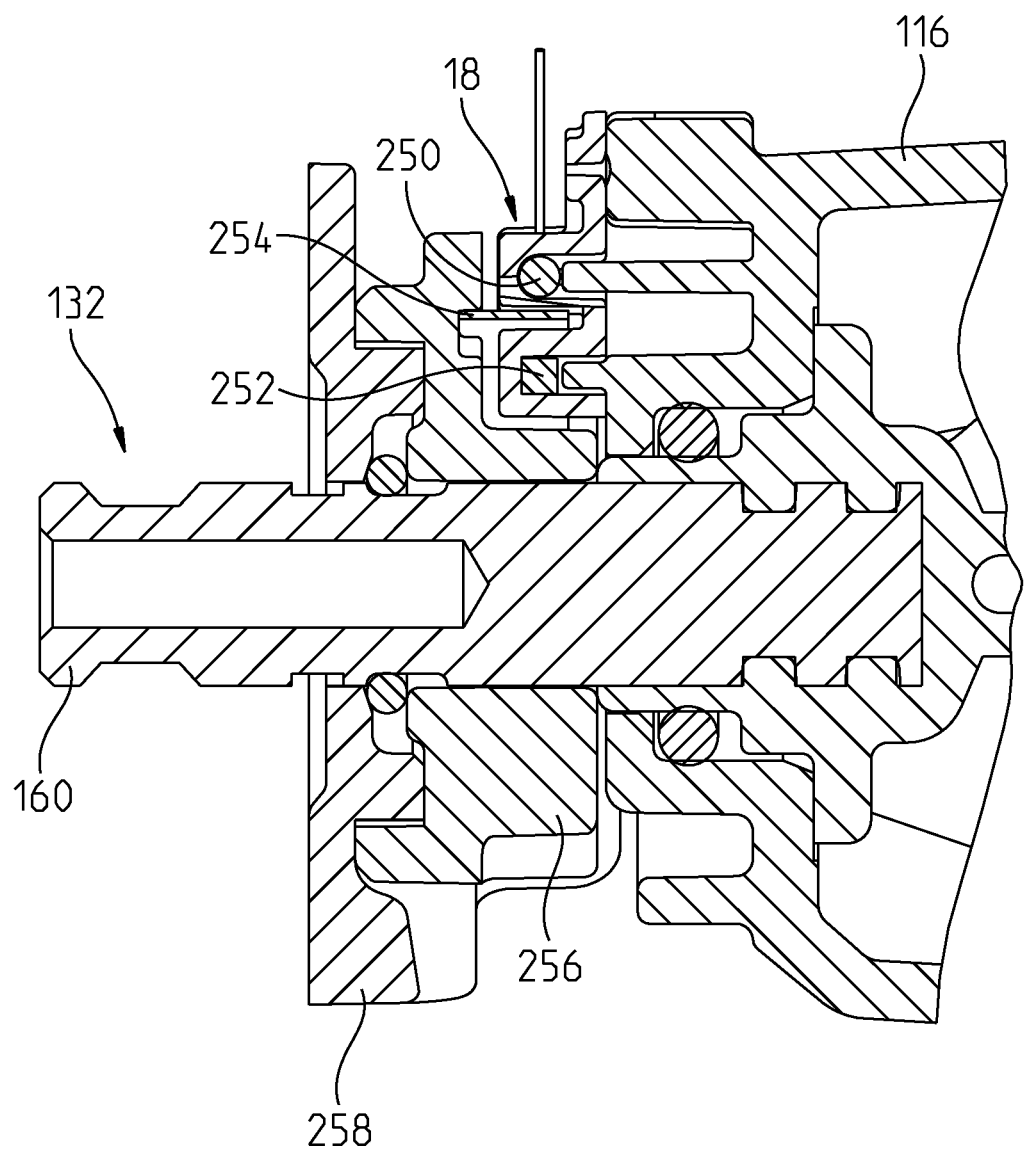
FIG. 16 is a cross-sectional view taken along line 16-16 of FIG. 9.

With reference to FIGS. 14 and 15, the flow director 210 illustratively includes an arcuate outer wall 214 configured to direct water to an outlet 216. A mixer 218 is illustratively positioned proximate the outlet 216 and includes mixing vanes 220. The mixing vanes 220 include curved surfaces 222 to impart rotational movement to the water and assist in the mixing thereof.

A baffle 230 forces the mixed water to exit the valve cartridge 12 proximate the sensing end 192 of the thermistor 190. The baffle 230 is illustratively molded from a polymer and includes a base 232 and axially extending walls 234. The base 232 includes openings 236 and 238 to receive the inlet tubes 72 and 74, respectively. An elastomeric seal 240 is illustratively overmolded with the base 232 to provide a fluid seal around the inlets 72 and 74 and the inner surface of the valve body 14 when assembled. An opening 241 is formed in the base 232 (FIGS. 10 and 13) and receives a portion of the thermistor 190. More particularly, the opening 241 directs water to the sensing end 192 of the thermistor 190.

The flow director 210 and the baffle 230 cooperate to facilitate efficient mixing of the water and delivery of the water to the sensing end of the thermistor 190. As shown in FIG. 15, hot and cold water (represented by arrows 242 and 244) flow through inlets 72 and 74 to valve plate 130. Upon rotation of the valve plate 130, the hot and cold water 242 and 244 is mixed within the cap 116. The mixed water (represented by arrows 246) is then directed by the flow director 210 through the mixer 218. The baffle 230 then directs the mixed water 246 toward the sensing end 192 of the thermistor 190.

With reference to FIGS. 12, 13, 16, 17A and 17B, position sensor 18 is supported by the retainer 200 and the stem assembly 132, and is configured to provide an indication of the rotational position of the stem assembly 132. In one illustrative embodiment, the position sensor 18 includes a reed switch 250 cooperating with a magnet 252. A magnetic field blocking member or shield 254, illustratively in the form of a ferrous metal strip, is supported by the stem assembly 132 and is configured to move with rotation thereof. The reed switch 250 is positioned in close proximity to the magnet 252, which creates a magnetic field that activates the normally open reed switch 250. The reed switch 250 and the magnet 252 are held in place by the retainer 200. The shield 254, when placed in the magnetic field, disrupts the field and the reed switch 250 is then in an off or closed position. The shield 254 is illustratively supported by a temperature limit stop 256 which is connected to the valve stem assembly 132. As such, the reed switch 250 changes between open and closed states depending upon the rotational position of the valve stem assembly 132.

The temperature limit stop 256 cooperates with a limiter 258 to control the water flow through the valve cartridge 12 by limiting rotational travel of the valve stem assembly 132. The limiter 258 is illustratively adjustable by splines 260 of the limiter 258 (FIG. 13) cooperating with the splines 262 of the temperature limit stop 256 (FIG. 12) to set a maximum water temperature. An o-ring 264 is received over the valve stem 160 intermediate limit stop 256 and limiter 258. Additional details of an illustrative maximum water temperature limit stop is disclosed in U.S. Patent Application Publication No. US 2009/0108223 to Deutsch et al., the disclosure of which is expressly incorporated by reference herein.

Figure 8:
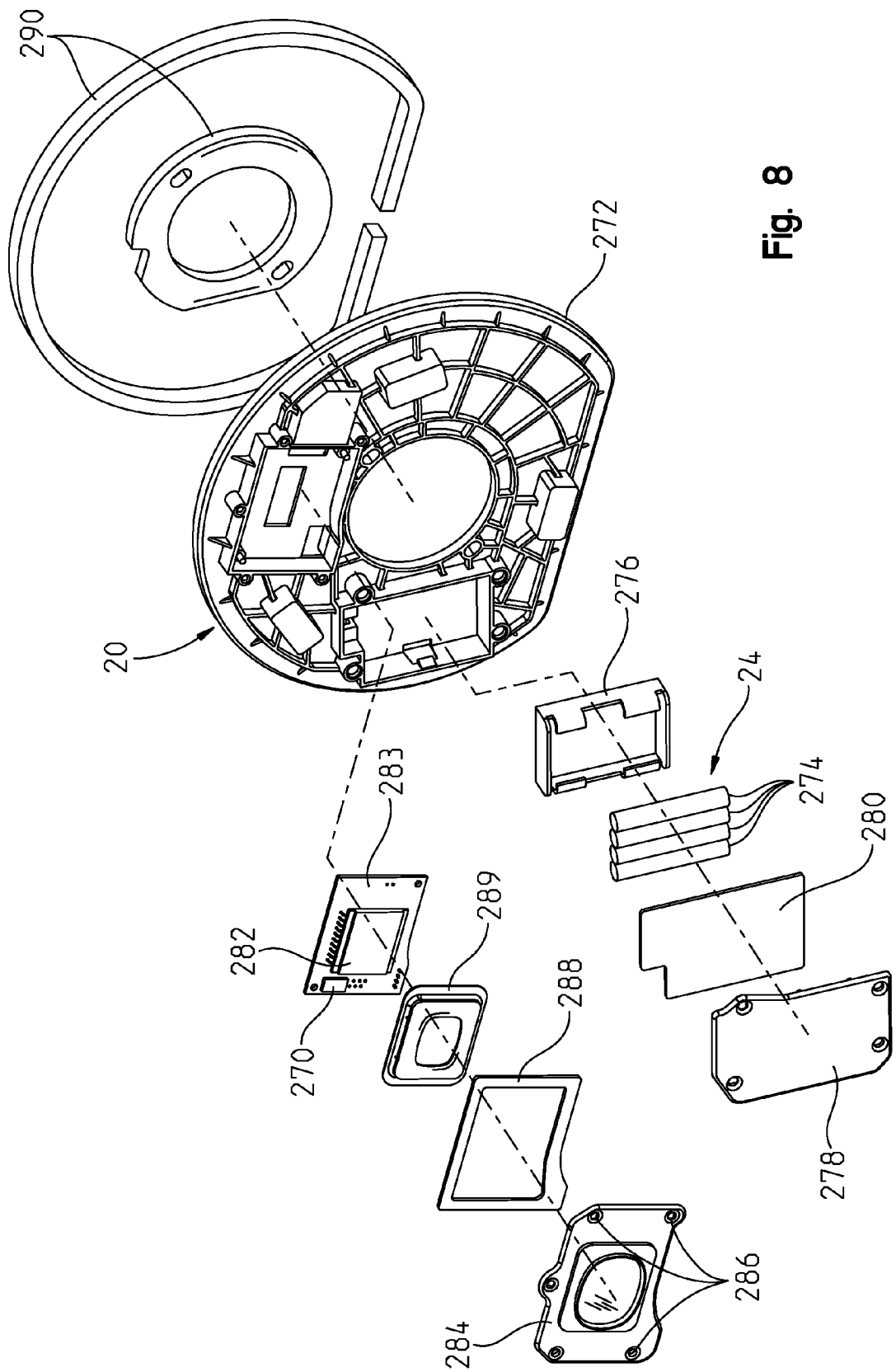
FIG. 8 is a front exploded perspective view of the mounting assembly of FIG. 1.

Electronics 22 illustratively include a controller 270, such as a microprocessor, operably coupled with the temperature sensor 16 and the position sensor 18. More particularly, a cable 269 with an electrical connector 271 may provide electrical communication between the controller 270 and the thermistor 190 (FIG. 9). In certain illustrative embodiments, the cable 269 may also provide electrical communication between the controller 270 and the reed switch 250. With reference to FIGS. 7 and 8, the controller 270 may be supported by a body 272 of the mounting assembly 20. The body 272 illustratively comprises a backplate molded from a polymer. Power supply 24, illustratively batteries 274, is in electrical communication with the controller 270 and is received within a battery compartment 276 supported within the body 272 of the mounting assembly 20. A battery cover 278 and seal 280 encloses the battery compartment 276 and seals the batteries 274 from moisture.

Electronics 22 further illustratively include a display, illustratively a temperature display 282 in electrical communication with the controller 270 and supported by the body 272 of the mounting assembly 20. The temperature display 282 may comprise a liquid crystal display (LCD) configured to provide a digital output of the water temperature detected by the temperature sensor 16. In one illustrative embodiment, the controller 270 and the temperature display 282 may both be supported on a printed circuit board 283.

While temperature sensor 16 is shown in the illustrative embodiment valve assembly 10, it should be noted that other types of water parameter sensors may be used. For example, water flow and water pressure sensors may be substituted for, or used in combination with, the temperature sensor 16. More particularly, a water flow sensor may be configured to measure the flow rate of water in the outlet port 64 of the valve cartridge 12, wherein the display 282 is configured to provide a visual indication to the user of the measured flow rate. Similarly, a water pressure sensor may be configured to measure pressure of water in the outlet port 64 of the valve cartridge 12, wherein the display 282 is configured to provide a visual indication to the user of the measured pressure.

A timer or clock (not shown) may be provided, illustratively as part of the controller 270. In such an embodiment, the display 282 may provide a visual indication of elapsed time since activation of the valve cartridge 12. In other embodiments, the display 282 may provide an indication of other conditions, such as current time, current date, power status, etc.

With reference to FIGS. 4, 6 and 7, a lens cover 284 is fastened to the body 272 of the mounting assembly 20 by screws 286 and forms a sealed unit through a gasket 288. A mask 289, illustratively formed of a polymer, may be received around the temperature display 282 and is configured to conceal the outer edges of the display 282. A first opening 291 is illustratively formed in the escutcheon 28 to accommodate the temperature display 282, while a second opening 293 is illustratively formed in the escutcheon 28 to receive the trim sleeve 30 adjacent the handle 32.

The mounting assembly 20 seals to the finish shower wall 26 using a gasket 290, illustratively formed of a closed cell foam. The escutcheon 28 is releasably secured onto the body 272 through a conventional fastener, such as a hook and loop or mushroom head snap fastener. As further detailed herein, the escutcheon 28 may also be releasably secured to the body 272 through a bayonet coupler 292.

Figure 17B:
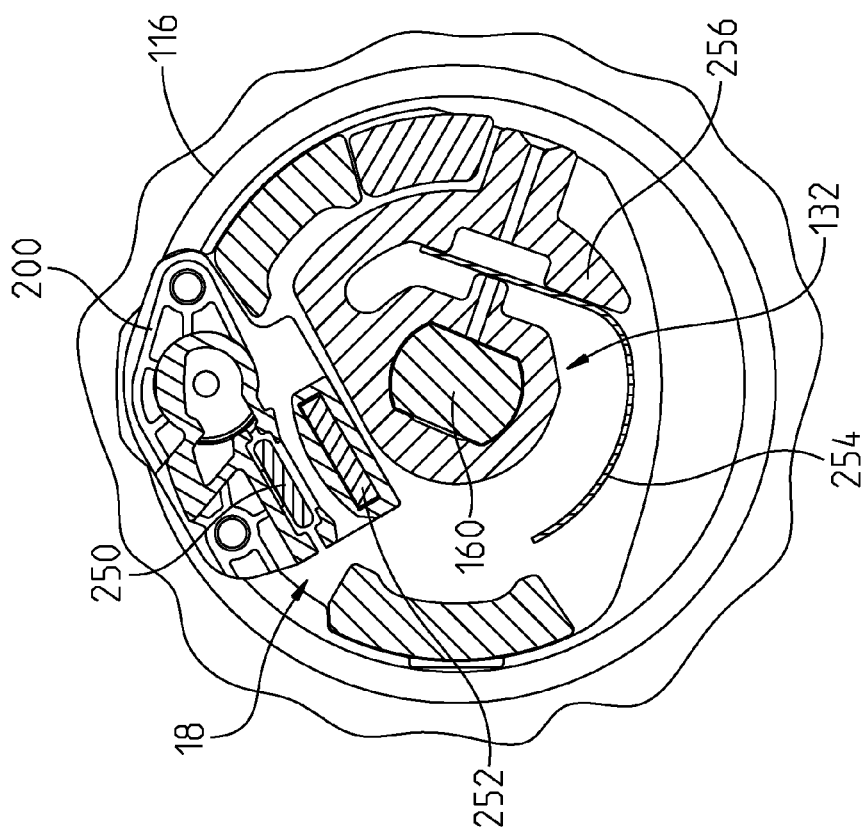
FIG. 17B is a cross-sectional view similar to FIG. 17A, showing the mixing valve cartridge in an on position.
Figure 17A:
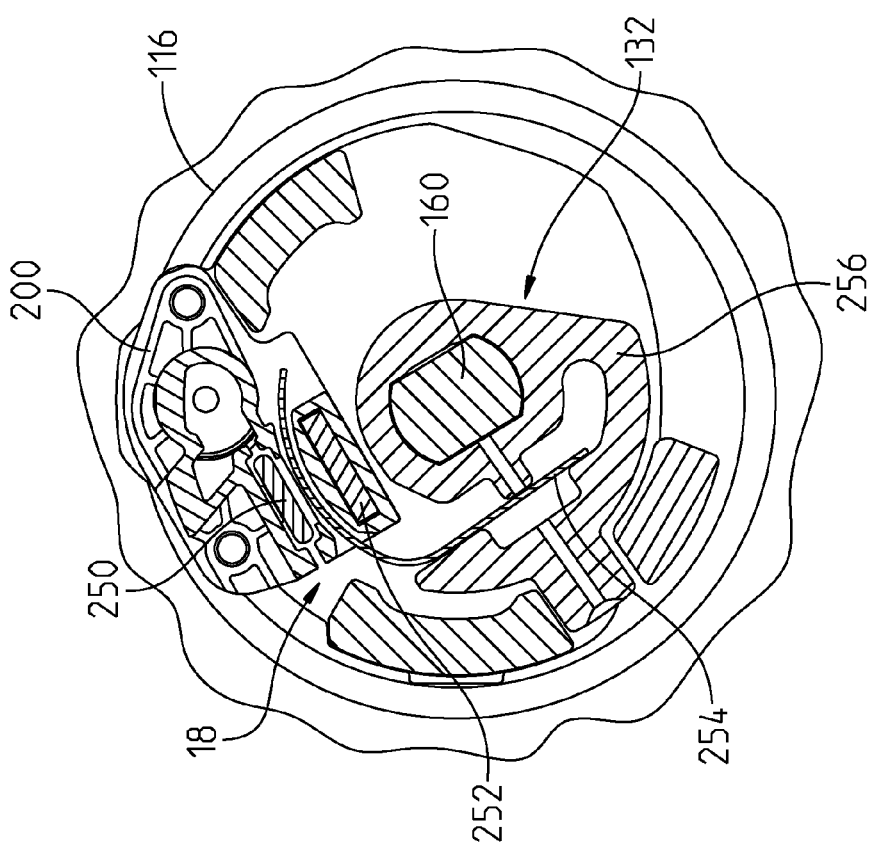
FIG. 17A is a cross-sectional view taken along line 17-17 of FIG. 9, showing the mixing valve cartridge in an off position.

As shown in FIG. 17A, the shield 254 is positioned between the magnet 252 and the reed switch 250 when the valve stem assembly 132 is in a first, or off, rotational position. Therefore, the reed switch 250 is not activated when the valve cartridge 12 is off (i.e., not dispensing water). When the reed switch 250 is not activated, the temperature display 282 is off or deactivated. The valve plate 130 is closed such that the valve cartridge 12 is not dispensing water at this point. Illustratively, the position sensor 18 opens the circuit between the batteries 274 and the temperature display 282 when the valve stem assembly 132 is in the first rotational position, thereby preventing power from the batteries 274 being supplied to the temperature display 282. In other illustrative embodiments, the position sensor 18 may provide a signal to the controller 270 which, in turn, deactivates the temperature display 282 when the valve stem assembly 132 is in the first rotational position.

As the valve stem assembly 132 begins to turn counter-clockwise toward the second, or on, rotational position shown in FIG. 17B, the shield 254 moves out of the area between the magnet 252 and the reed switch 250. When the reed switch 250 is activated, the temperature display 282 to turns on or is activated. The valve plate 130 will cause the water to flow toward the outlet 64 in this position, such that the valve cartridge 12 is dispensing water. Illustratively, the position sensor 18 closes the circuit between the batteries 274 and the temperature display 282 when the valve stem assembly 132 is in the second rotational position, thereby allowing power from the batteries 274 to be supplied to the temperature display 282. In other illustrative embodiments, the position sensor 18 may provide a signal to the controller 270 which, in turn, activates the temperature display 282 when the valve stem assembly 132 is in the second rotational position.

With reference to the illustrative embodiment of FIGS. 17A and 17B, the length of the shield 254 may be adjusted to control the point at which the temperature display 282 is activated. Illustratively, the water will begin flowing slightly before the display 282 comes on so that the display 282 is never on when water is not flowing.

Figure 18:
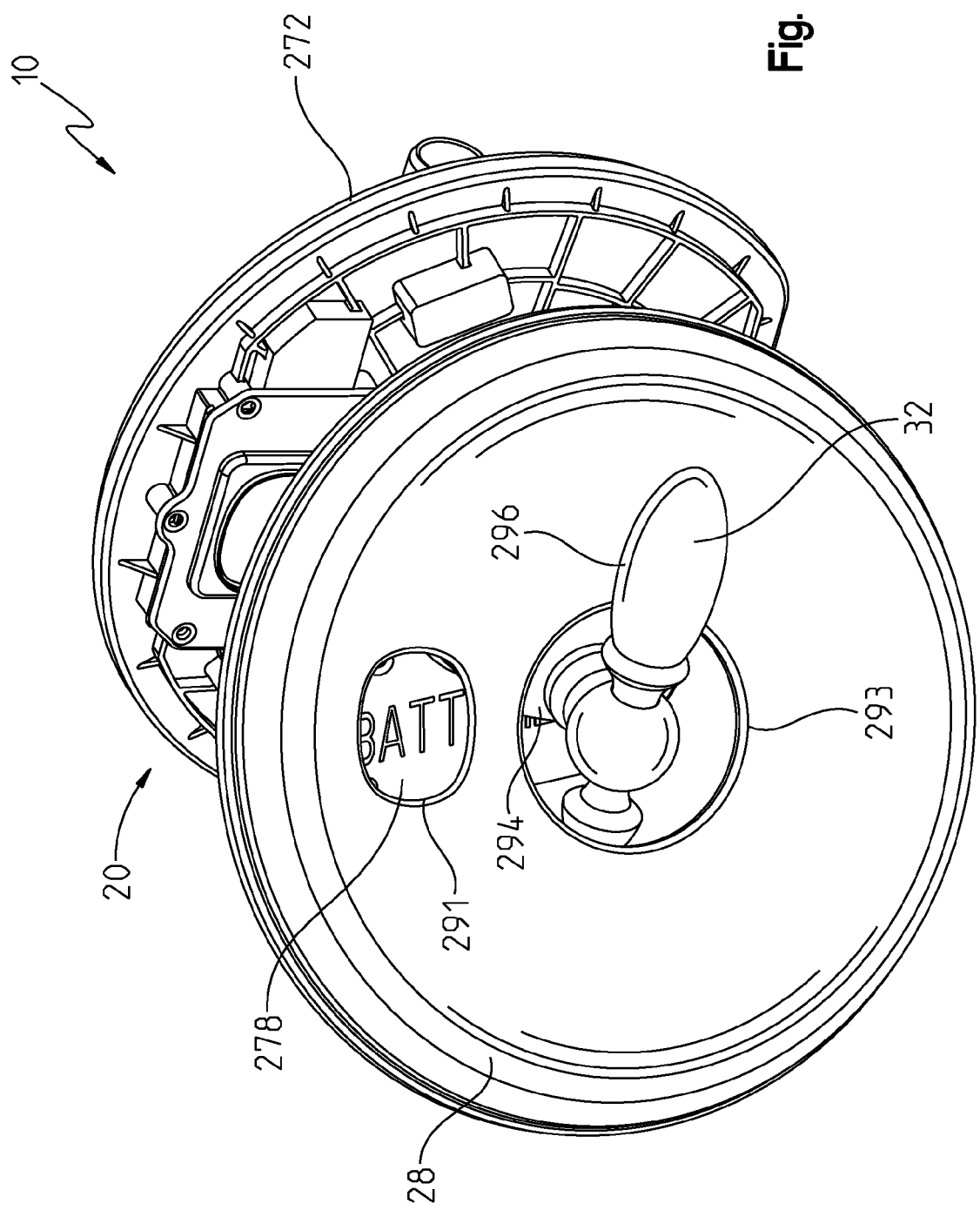
FIG. 18 is a perspective view of the escutcheon removed from the mounting assembly of the mixing valve assembly of FIG. 1.

With reference to FIG. 18, when changing the batteries 274, the escutcheon 28 may be uncoupled from the mounting body 272 and removed without removing the handle 32. In other words, the second opening 293 of the escutcheon 28 may pass over the handle 32 while the handle 32 remains coupled to the stem 160. More particularly, the user uncouples the escutcheon 28 from the mounting body 272, moves the escutcheon 28 such that the opening 293 passes axially over the trim sleeve 30 and a hub 294 of the handle 32, and then tilts the escutcheon 28 such that the opening 293 passes over a lever 296 of the handle 32. This allows for simple replacement of the batteries 274 without requiring removal of the mounting assembly 20 from the shower wall 26. The display lens cover 284 may provide a pry point where a user may apply leverage through opening 291 in the escutcheon 28 to assist in removing the escutcheon 28 from the mounting assembly body 272.

Figure 19:
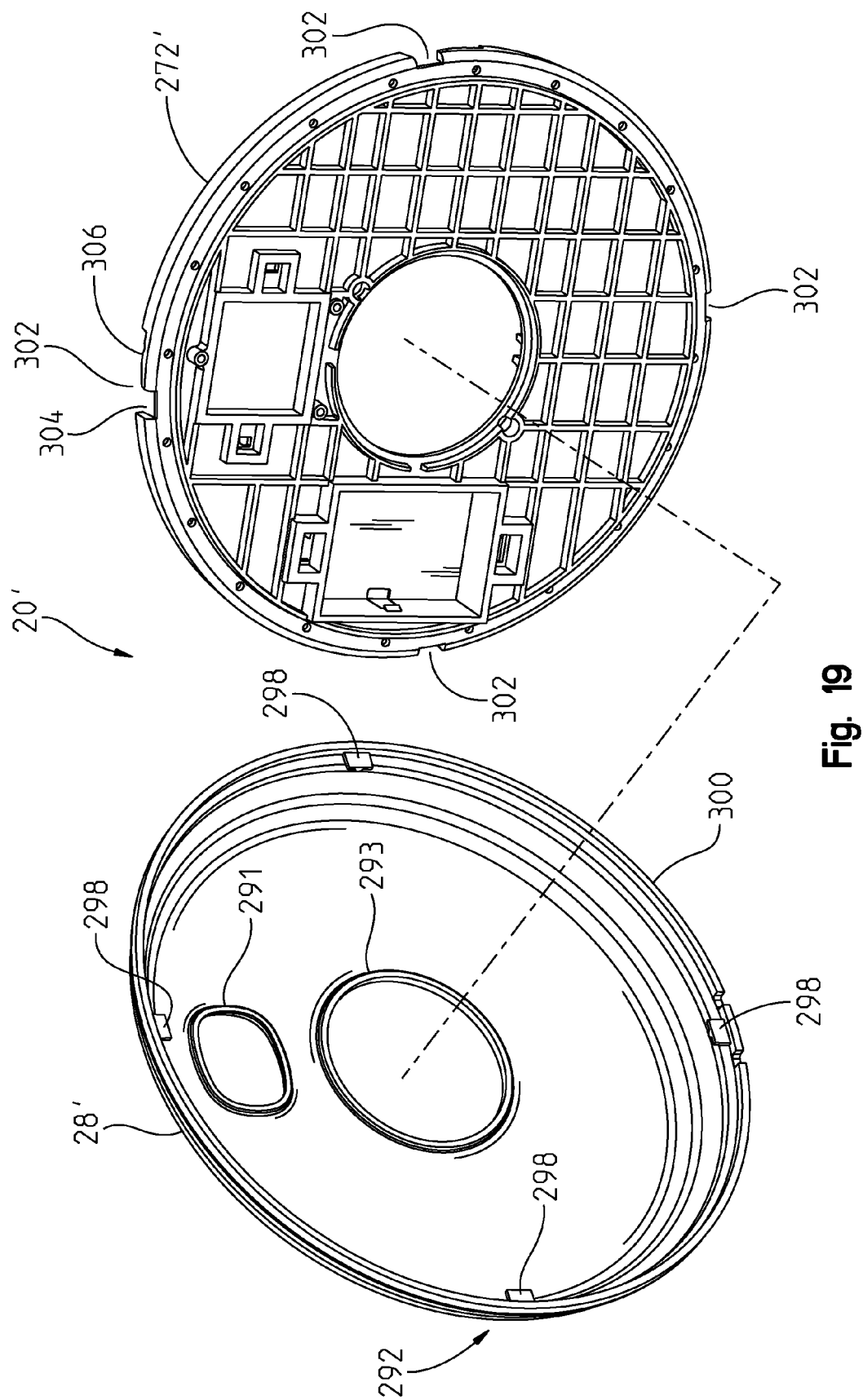
FIG. 19 is a perspective view of a further illustrative embodiment escutcheon and mounting assembly.

In the illustrative embodiment of FIG. 19, mounting assembly 20' includes bayonet coupler 292 releasably securing escutcheon 28' to mounting body 272'. The bayonet coupler 292 illustratively includes circumferentially spaced tabs 298 supported by escutcheon 28' and extending radially inwardly from an outer edge or lip 300. The tabs 298 are configured to be received within cooperating slots 302, each including an axial portion 304 and a circumferential portion 306. In operation, a user axially aligns the tabs 298 with the axial portions 304 of the slots 302, and then rotates the escutcheon 28' clockwise such that the tabs 298 extend into the circumferential portions 306 of the slots 302. When the tabs 298 are received within the circumferential portions 306 of slots 302, the escutcheon 28' is axially secured to the mounting body 272'.

As detailed above, the mixing valve assembly 10 includes a temperature display 282 and is configured to be retrofit into a conventional behind-the-wall valve body 14. This is facilitated by the valve cartridge 12 including temperature sensor 16. In order to conserve power, the temperature display 282 turns on and off based upon the position of the valve plate 130 as detected by position sensor 18. The temperature display 282 is off when the valve cartridge 12 is off (i.e., not dispensing water), and is on only when the valve cartridge 12 is on (i.e., dispensing water).

Although the invention has been described in detail with reference to certain preferred embodiments, variations and modifications exist within the spirit and scope of the invention as described and defined in the following claims.

The invention claimed is:

1. A mixing valve assembly comprising:
 a valve body housing configured to be supported within a shower wall, the valve body housing including an outlet port, a hot water supply port, and a cold water supply port;
 a valve cartridge supported by the valve body housing, the valve cartridge including:
  a cap;
  a valve plate including a first control opening in selective fluid communication with the hot water supply port and a second control opening in selective fluid communication with the cold water supply port, the valve plate being supported for rotation relative to the cap;
  a stem operably coupled to the valve plate, wherein rotation of the stem causes rotation of the valve plate and simultaneous movement of the first control opening and the second control opening to determine the amount of fluid communication with the hot water supply port and the cold water supply port for controlling a temperature of water provided to the outlet port; and
  a temperature sensor supported by the cap and having a sensing end in thermal communication with water provided to the outlet port for detecting water temperature;
 a mounting assembly configured to be supported outside of the shower wall, the mounting assembly including a temperature display in electrical communication with the temperature sensor to provide a visual indication of water temperature detected by the temperature sensor;
 a handle operably coupled to the stem and accessible exterior of the mounting assembly;
 a position sensor supported by the cap and configured to detect a rotational position of the stem; and
 wherein the temperature display is inactive when the position sensor detects a first rotational position of the stem, and the temperature display is active when the position sensor detects a second rotational position of the stem.

2. The mixing valve assembly of claim 1, wherein the position sensor comprises a reed switch, a magnet, and a shield supported by the stem and configured to selectively block the magnet from the reed switch in response to rotation of the stem.

3. The mixing valve assembly of claim 1, further comprising a battery in selective electrical communication with the temperature display, wherein the temperature display is not in electrical communication with the battery when the position sensor detects a first rotational position of the stem, and the temperature display is in electrical communication with the battery when the position sensor detects a second rotational position of the stem.

4. The mixing valve assembly of claim 2, further comprising a controller in electrical communication with the temperature sensor, the position sensor and the battery.

5. The mixing valve assembly of claim 1, further comprising an escutcheon releasably secured to the mounting assembly, wherein the escutcheon may be uncoupled and removed from the mounting assembly while the handle remains coupled to the stem.

6. The mixing valve assembly of claim 5, further comprising a bayonet coupling releasably securing the escutcheon to the mounting assembly.

7. A mixing valve cartridge configured to be removably received within a valve body housing, the mixing valve cartridge comprising:
   a cap;
   a valve plate including a first control opening in selective fluid communication with a hot water supply port of the valve body housing and a second control opening in selective fluid communication with a cold water supply port of the valve body housing, the valve plate being supported for rotation relative to the cap;
   a stem operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to an outlet port of the valve body housing;
   a temperature sensor supported by the cap, the temperature sensor extending axially between a connection end and a sensing end, the connection end configured to be in electrical communication with a temperature display and the sensing end configured to be in thermal communication with water provided to the outlet port of the valve body housing;
   a position sensor operably coupled to the stem, the position sensor including a shield supported for rotation with the stem;
   a temperature display, and a battery in selective electrical communication with the temperature display, wherein the temperature display is not in electrical communication with the battery when the position sensor detects a first rotational position of the stem, and the temperature display is in electrical communication with the battery when the position sensor detects a second rotational position of the stem; and
   a controller in electrical communication with the temperature sensor, the position sensor and the battery.

8. The mixing valve cartridge of claim 7, further comprising a handle operably coupled to the stem.

9. A mixing valve cartridge configured to be removably received within a valve body housing, the mixing valve cartridge comprising:
   a cap;
   a valve plate including a first control opening in selective fluid communication with a hot water supply port of the valve body housing and a second control opening in selective fluid communication with a cold water supply port of the valve body housing, the valve plate being supported for rotation relative to the cap;
   a stem operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to an outlet port of the valve body housing;
   a temperature sensor supported by the cap, the temperature sensor extending axially between a connection end and a sensing end, the connection end configured to be in electrical communication with a temperature display and the sensing end configured to be in thermal communication with water provided to the outlet port of the valve body housing; and
   a position sensor operably coupled to the stem;
   wherein the position sensor comprises a reed switch, a magnet supported by the cap, and a shield supported by the stem and configured to selectively block the magnet from the reed switch in response to rotation from the stem.

10. A mixing valve assembly comprising:
    a valve body configured to be supported within a shower wall, the valve body including an outlet port, a hot water supply port, and a cold water supply port;
    a valve cartridge supported by the housing, the valve cartridge including:
    a cap;
    a valve plate including a first control opening in selective fluid communication with the hot water supply port and a second control opening in selective fluid communication with the cold water supply port, the valve plate being supported for rotation relative to the cap;
    a stem operably coupled to the valve plate, wherein rotation of the stem causes rotation of the valve plate and simultaneous movement of the first control opening and the second control opening to determine the amount of fluid communication with the hot water supply port and the cold water supply port for controlling the temperature of water provided to the outlet port;
    a position sensor operably coupled to the stem;
    a display configured to provide a visual indication to a user when in an active state, wherein the display is in an active state when the position sensor detects that the stem is in a first rotational position, and the display is in an inactive state when the position sensor detects that the stem is in a second rotational position; and
    wherein the position sensor comprises a reed switch, a magnet supported by the cap, and a shield supported by the stem and configured to selectively block the magnet from the reed switch in response to rotation of the stem.

11. The mixing valve assembly of claim 10, further comprising a mounting plate configured to be supported outside of the shower wall, the mounting plate supporting the display.

12. The mixing valve assembly of claim 11, further comprising a handle operably coupled to the stem exterior of the mounting plate.

13. The mixing valve assembly of claim 12, further comprising an escutcheon releasably secured to the mounting plate, wherein the escutcheon may be uncoupled and removed from the mounting plate while the handle remains coupled to the stem.

14. The mixing valve assembly of claim 13, further comprising a bayonet coupling releasably securing the escutcheon to the mounting plate.

15. The mixing valve assembly of claim 10, further comprising a power source in selective electrical communication with the display based upon the output of the position sensor.

16. The mixing valve assembly of claim 15, further comprising a water parameter sensor configured to detect at least one of flow rate, temperature and pressure of water in the outlet port of the valve body, wherein the display is configured to provide a visual indication of the at least one of flow rate, temperature and pressure of water.

17. The mixing valve assembly of claim 16, wherein the water parameter sensor comprises a temperature sensor supported by the cap and having a sensing end in thermal communication with water in the outlet port of the valve body.

18. The mixing valve assembly of claim 16, further comprising a controller in electrical communication with the water parameter sensor, the position sensor and the power source.

19. The mixing valve assembly of claim 10, further comprising a timer, wherein the display is configured to provide a visual indication of elapsed time.

* * * * *